United States Patent [19]
Long et al.

[11] Patent Number: 5,319,636
[45] Date of Patent: Jun. 7, 1994

[54] DEVICE AND METHOD FOR LINEAR LISTENER ECHO CANCELLATION

[75] Inventors: Guozhu Long, Canton; Fuyun Ling, Jamaica Plain; M. Vedat Eyuboglu, Boson, all of Mass.

[73] Assignee: Codex Corporation, Mansfield, Mass.

[21] Appl. No.: 791,702

[22] Filed: Nov. 14, 1991

[51] Int. Cl.[5] .............................................. H04J 15/00
[52] U.S. Cl. .................................. 370/32.1; 379/406; 379/410
[58] Field of Search ................... 370/32.1, 32; 375/34, 375/103, 119, 120; 379/406, 407, 410, 411; 333/18

[56] References Cited

U.S. PATENT DOCUMENTS

| | | | |
|---|---|---|---|
| 4,613,731 | 9/1986 | Godard | 333/18 |
| 4,745,600 | 5/1988 | Herman et al. | 370/95 |
| 4,995,031 | 2/1991 | Aly et al. | 370/32.1 |
| 5,117,418 | 5/1992 | Chaffee et al. | 379/406 |
| 5,132,963 | 7/1992 | Ungerboeck | 379/410 |
| 5,189,664 | 2/1993 | Cheng | 370/32.1 |

OTHER PUBLICATIONS

"Optimum FIR Digital Filter Implementations for Decimation, Interpolation, and Narrow-Band Filtering", by Ronald E. Crochiere and Lawrence R. Rabiner, IEEE Transactions on Acoustics, Speech, and Signal Processing, vol. ASSP-23, No. 5, Oct. 1975.

"Digital Methods for Conversion Between Arbitrary Sampling Frequencies", by Tor A. Ramstad, IEEE Transactions on Acoutics, Speech, and Signal Processing, vol. ASSP-32, No. 3, Jun. 1984.

*Primary Examiner*—Douglas W. Olms
*Assistant Examiner*—Shick Hom
*Attorney, Agent, or Firm*—Darleen J. Stockley

[57] ABSTRACT

A device and method utilize a linear feedback/feedforward configuration to estimate and cancel a listener echo wherein equalizer (202) and listener echo cancellation (204 and 208) units are jointly updated, allowing determination of an error signal once (204 and 208), in place of the former method of separate error signal determination for each of an equalizer and a listener echo canceller. An improved phase-correction scheme is utilized to compensate the frequency offset in the listener echo. The relationship between the listener echo and talker far echo is utilized to facilitate the listener echo cancellation.

48 Claims, 7 Drawing Sheets

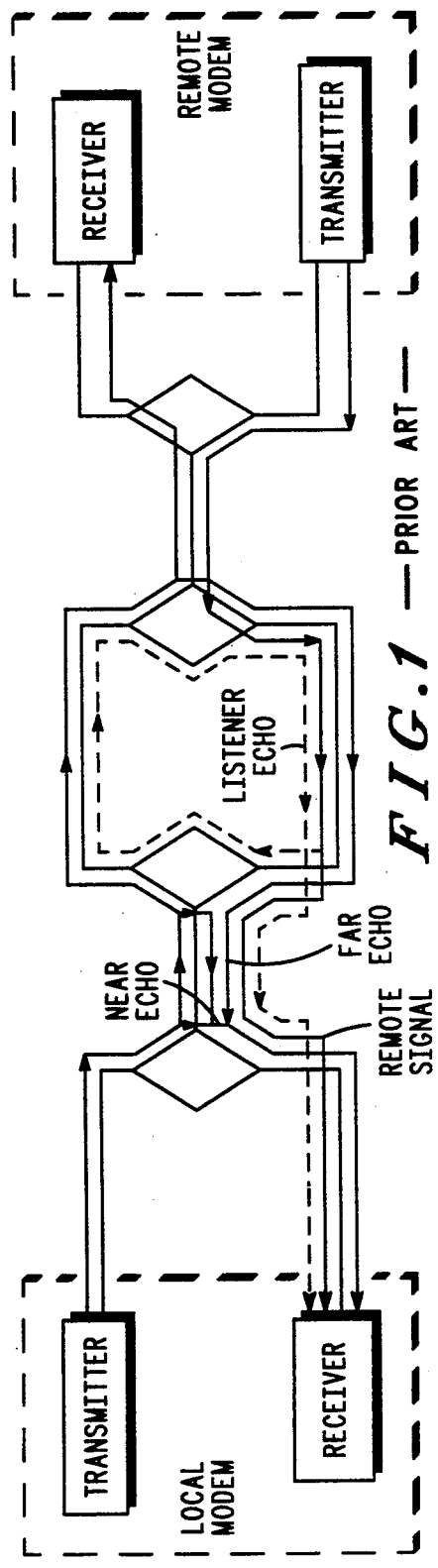
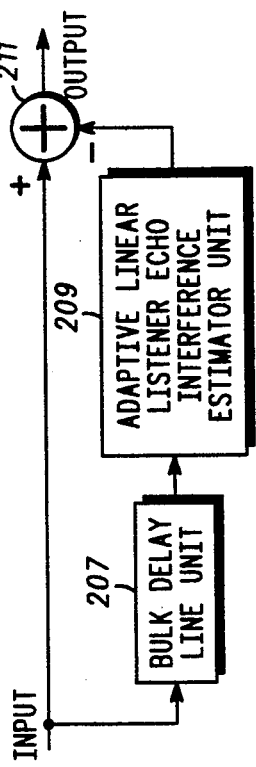
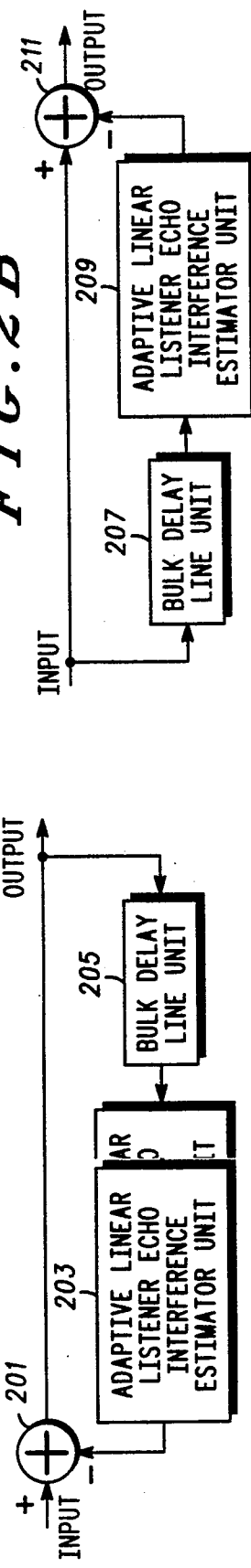
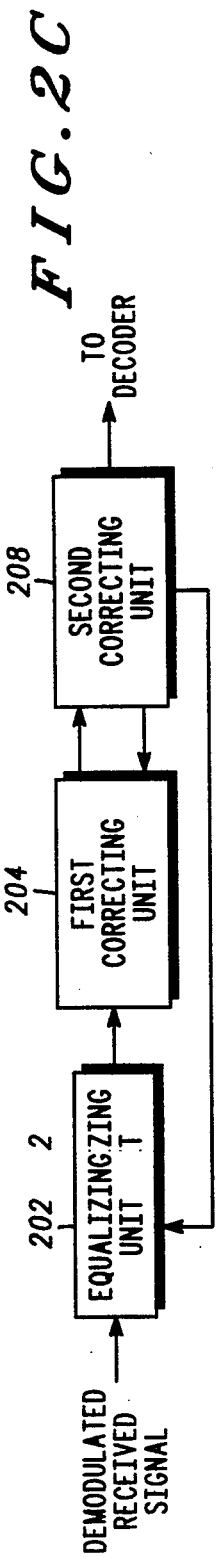
FIG.1 —PRIOR ART—
FIG.2A
FIG.2B
FIG.2C

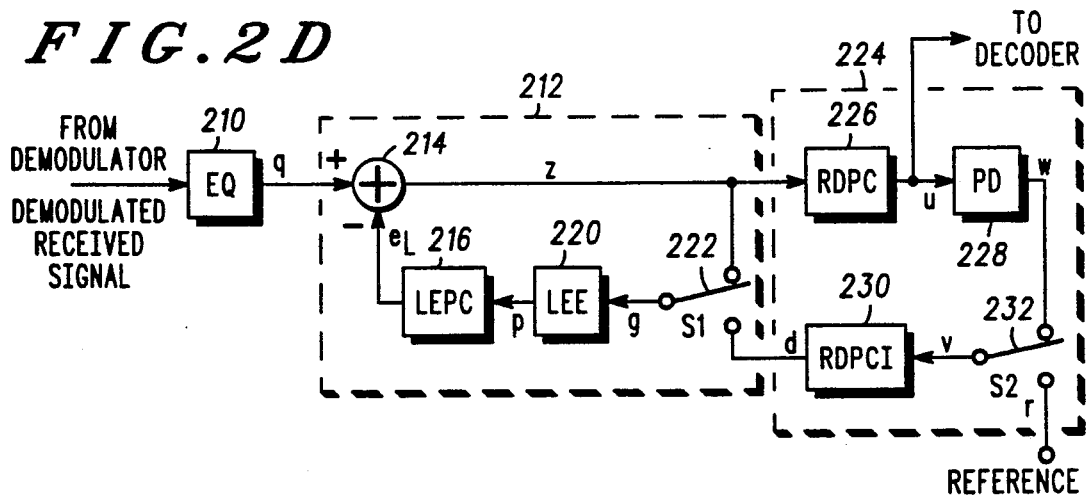
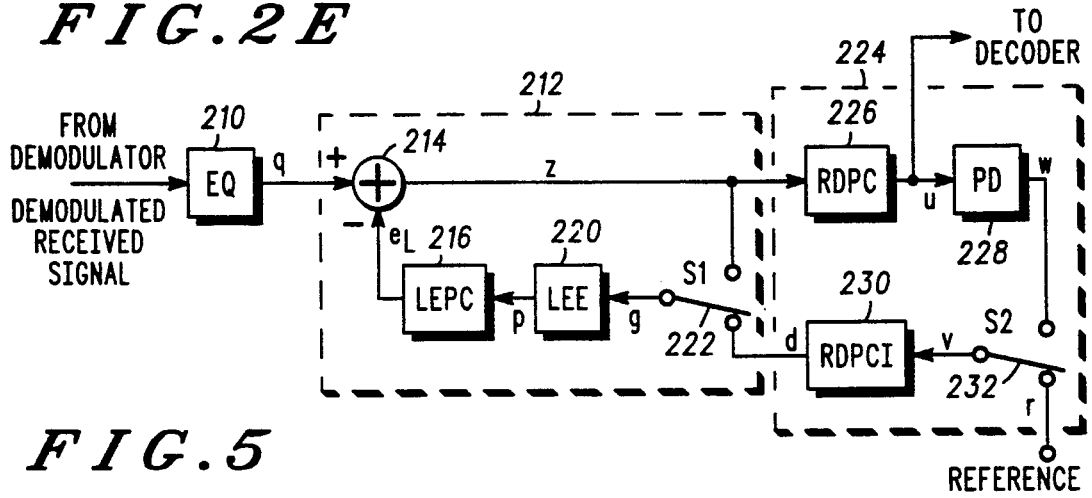
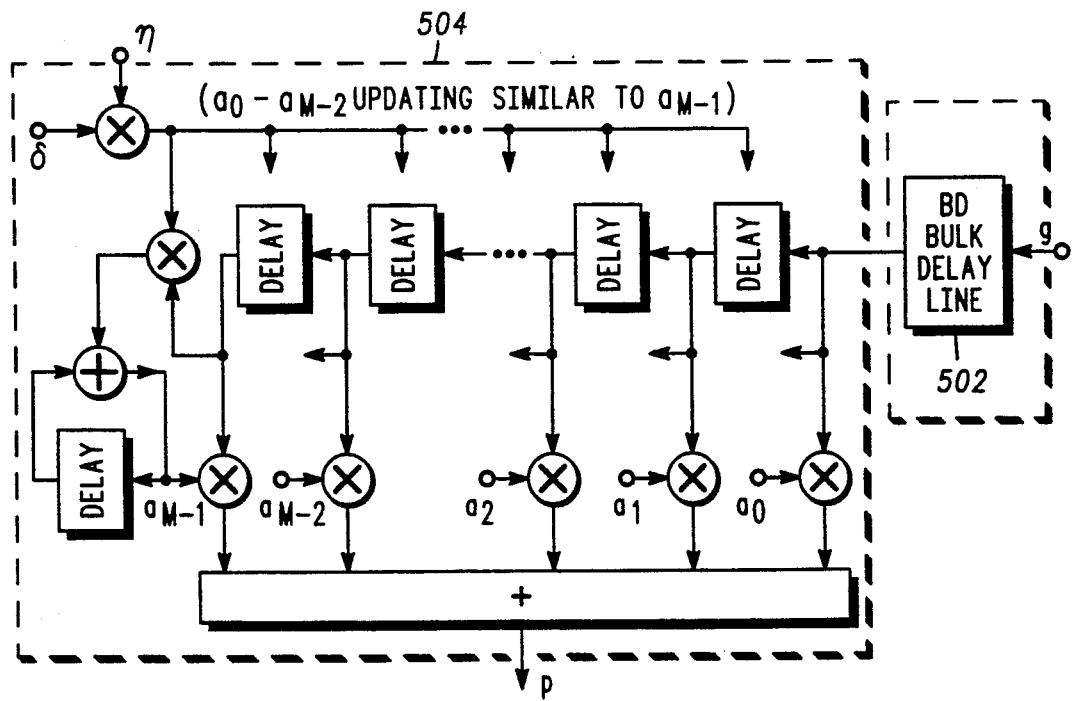

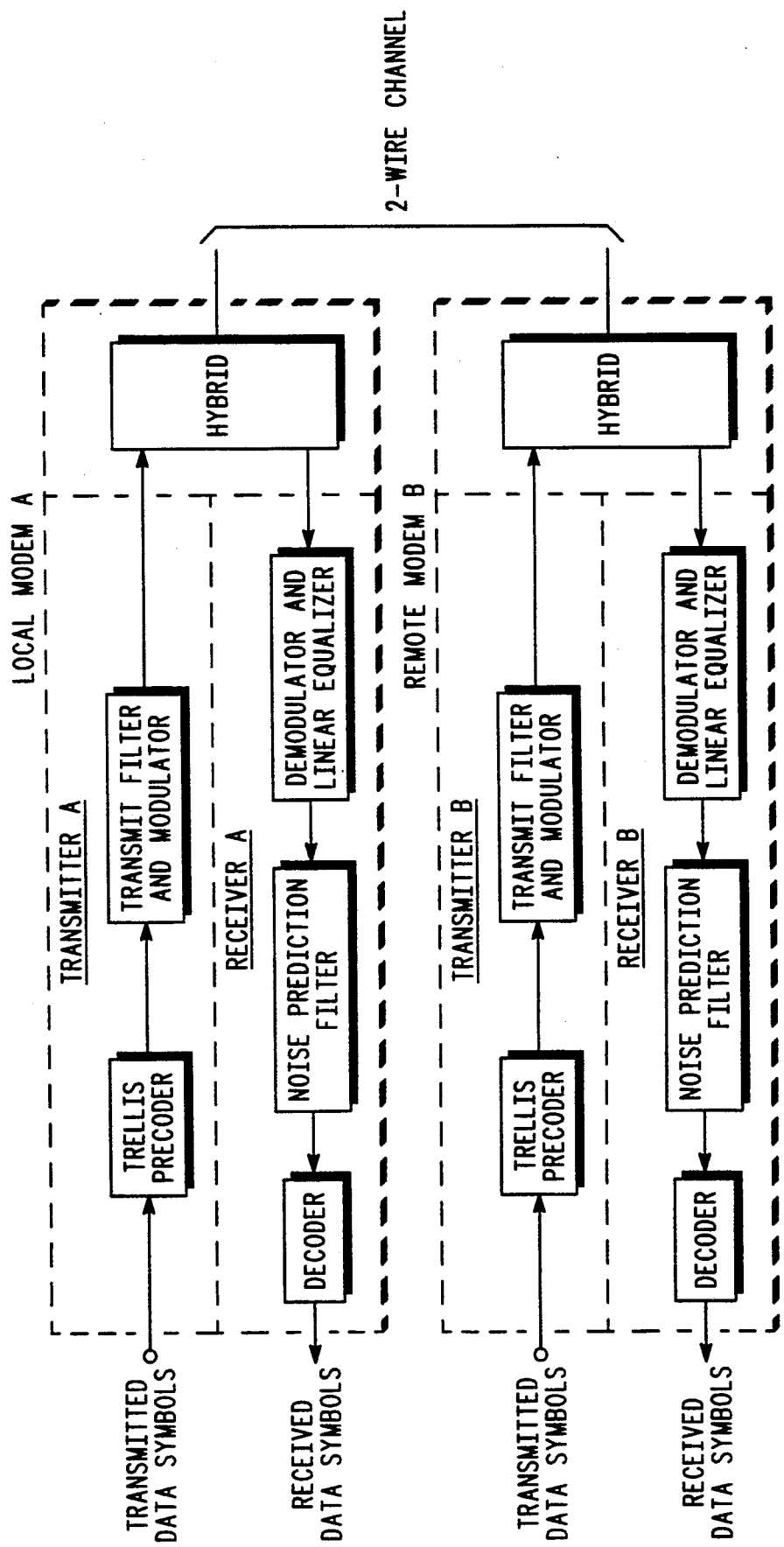

DEVICE AND METHOD FOR LINEAR LISTENER ECHO CANCELLATION

FIELD OF THE INVENTION

This invention relates generally to synchronous digital information transmission systems, and more particularly, to echo cancellation in such transmission systems.

BACKGROUND

Data communication equipment (DCE) such as modems are generally utilized to transmit and receive data over a communication channel. High speed modems typically use bandwidth-efficient modulation schemes such as quadrature modulation. In such a system that utilizes binary data, the data is first mapped into a sequence of complex signal points or symbols selected from a constellation with a finite number of points. A real-valued transmitted signal is utilized to carry information about this complex sequence.

One category of DCEs, often referred to as full-duplex modems, is capable of transmitting and receiving simultaneously over a two-wire communication link such as a telephone channel in the general switched telephone network. On such a two-wire telephone channel, hybrid couplers are commonly used to perform two to four wire conversions which separate the data transmission in both directions. Due to imperfect impedance matching at the hybrid couplers, data transmission separations are not ideal. Thus, there exist echoes that interfere with normal data transmission. Such echoes may be divided into two categories: a talker echo and a listener echo. The talker echo signal, generated by an outgoing signal from a local modem's transmitter, typically includes a near echo component and a far echo component. The near echo is generated by hybrids in the local modem and a near-end telephone central office, and the far echo signal is mainly generated by hybrids in a remote central telephone office and a remote modem. The far echo signal is delayed in time relative to the near echo signal since it travels a round trip around the telephone channel. The far echo signal may also be corrupted by a frequency offset in the telephone network. The listener echo signal, in contrast, is generated by a data signal from the remote modem's transmitter. The overall channel that the listener echo signal passes through can be viewed as a cascade of the channel that a normal received data signal passes through and an extra channel that includes the round trip telephone trunk and two trans-hybrid paths on both sides of the trunk, as is illustrated in FIG. 1. The listener echo signal is delayed in time with respect to the normal received data signal since it travels an extra round trip around the telephone network. Both the talker far echo delay and the listener echo delay are about equal to the telephone trunk round trip delay, and hence are nearly equal to each other.

Similar to the talker far echo signal corruption, the listener echo signal may also be corrupted by a frequency offset, often designated as phase roll, thereby complicating cancellation of that echo signal. Thus, phase correction circuitry is needed to track and correct phase variations in the echo.

The listener echo total frequency offset consists of a sum of two components. The first component corresponds to the normal received data frequency offset, while the second component corresponds to the frequency offset of the listener echo relative to the normal received data signal, which is substantially equal to the talker far echo frequency offset. Further, the second component is substantially equal to a sum of the normal data frequency offsets in the transmission and the reception directions, typically being smaller than the first component and a total frequency offset.

Most existing two-wire full-duplex high-speed modems come equipped with an adaptive talker echo canceller that is capable of nearly eliminating the talker echoes, including the near and the far talker echoes. The listener echo is often much weaker than the normal received data signal. The ratio between the normal received data signal and the listener echo signal is computed as the total signal loss by the round trip telephone trunk and trans-hybrid losses on both sides of the telephone trunk. When this ratio is much greater than the required signal-to-noise ratio (SNR), the listener echo signal has little effect on the reception of the remote data. However, as the quality of the telephone network improves, the signal loss by the telephone trunk may be reduced, and thus the ratio between the normal received data signal and the listener echo signal may also be reduced. As a result, the listener echo signal may become problem, especially for very high-speed modems which may require a higher SNR to obtain reliable reception. In this case, elimination of the listener echo signal becomes necessary.

In the prior art listener echo cancellers have been implemented as a special form decision feedback equalizer. A detected data signal from an output of a decision device, after an appropriate delay corresponding to a listener echo delay, is fed back to a transversal filter whose coefficients are adaptively adjusted such that the filter's output, after correcting a total phase variation caused by a total frequency offset in the listener echo signal, becomes an estimate of the listener echo signal. This estimate is then typically subtracted from a phase-corrected equalizer output before it is sent to the decision device. Such a structure has two potential problems. First, as is the case for a conventional decision feedback equalizer, decision errors in the decision device may cause error propagation. Second, to obtain a more reliable decision, complex decision algorithms, such as a Viterbi decoding algorithm, are generally employed. A relatively long decision delay may be required for such a decoding algorithm. If the listener echo delay is shorter than this decision delay, the decision will not be readily available for the listener echo canceller. In addition, a major drawback is that a relationship between the listener echo signal and the talker far echo signal is typically disregarded, forcing estimation of the listener echo bulk delay by an extensive search scheme. Prior art compensates the total frequency offset using a simple first-order phase-locked loop (PLL). Thus, as is known in the art, an inherent compensation error by such a first-order PLL is proportional to the frequency offset to be compensated.

Hence, there is a need for a listener echo signal canceller that eliminates the problem of decision error propagation and that is not limited by decision delay, that utilizes information obtained for the talker far echo cancellation, and that improves phase correction.

SUMMARY OF THE INVENTION

A device and method are set forth for minimizing a listener echo signal interference in a demodulated, where desired, communication signal received over a channel having simultaneous transmission and reception. The device comprises at least a listener echo canceller for reducing a listener echo interference in a digital communication system having a selected sampling interval, and having a input and a output, said input comprising at least a sum of a desired signal and a listener echo interference, and said sampled output being substantially free of listener echo each interference, said listener echo canceller comprising: a bulk delay line means, operably coupled to receive and store at least one sample of one of: the input and the output of said listener echo canceller, to provide a bulk delay line output; an adaptive listener echo interference estimator means, operably coupled to receive the bulk delay line output, for generating an estimate of the listeners echo interference; and an interference cancelling means, operably coupled to receive the sampled input of the listener echo canceller and the estimate of the listener echo interference, for subtracting said estimate of the listener echo interference from said input of the listener echo canceller.

BRIEF DESCRIPTION OF THE DRAWINGS

FIG. 1 illustrates how a near echo, a far echo, and a listener echo formed in a local modem/remote modem system as is known in the art.

FIG. 2A is a block diagram of a first embodiment of a device of the present invention.

FIG. 2B is a block diagram of a second embodiment of a device of the present invention.

FIG. 2C is a block diagram of a third embodiment of a device of the present invention; FIGS. 2D and 2E are block diagrams of underlying exemplary first and second operation modes, respectively, of the third embodiment of the device of the present invention; 2D sets forth a block diagram of the device of the present invention in an exemplary data receiving linear feedback mode; 2E sets forth a block diagram of the device of the present invention in an exemplary reference directed training mode.

FIG. 5 is a block diagram setting forth an exemplary embodiment of the listener echo estimator of FIGS. 3 and 4.

FIG. 6 is block diagram of a local modem and a remote modem with precoding as is known in the art.

DETAILED DESCRIPTION OF A PREFERRED EMBODIMENT

Figure 3:
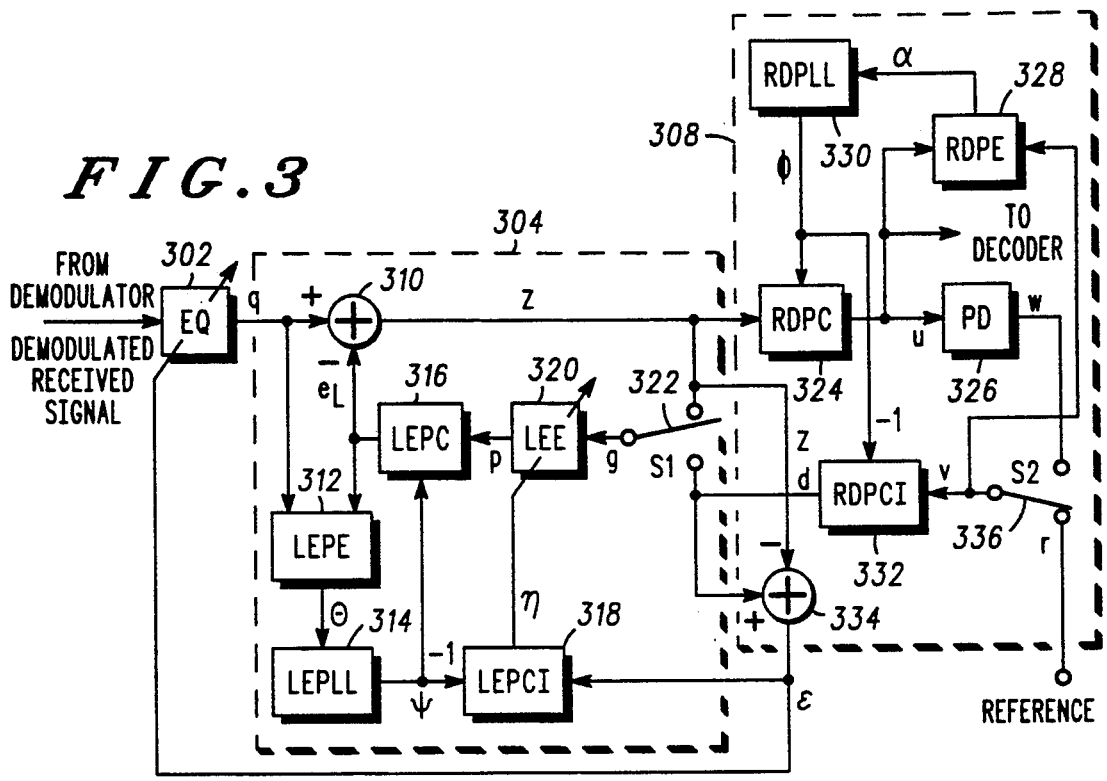
FIG. 3 is a block setting forth an exemplary embodiment of the linear feedback configuration implementation of the device of the present invention.

The present invention provides a device and method for an equalizer that includes a listener echo cancellation system that is stable, typically linear, and has a listener echo cancellation residual error that converges to a global minimum. In the present invention, the listener echo phase correction means needs to compensate only the listener echo frequency offset relative to the received data signal, which is typically smaller than the listener echo total frequency offset and easier to compensate. The present invention also utilizes a fact that such a frequency offset component is substantially equal to a talker far echo frequency offset, an estimate of which is typically available for far echo cancellation. In addition, the present invention utilizes a further fact, that the listener echo bulk delay relative to the received data signal is substantially equal to the talker far echo bulk delay relative to the near echo that is usually available for far echo cancellation. Further, an equalizer and a listener echo canceller are jointly updated to allow determination of an error signal only once, more efficiently than in the past where a separate error signal was determined for each of the equalizer and the listener echo canceller.

FIG. 2A is a block diagram of a first embodiment of the present invention, illustrating a feedback implementation of a listener echo canceller (LECR). An interference cancelling unit (201), operably coupled to receive a input to the listener echo canceller and an estimate of a listener echo interference from an adaptive listener echo interference estimator unit (203), subtracts the estimate of the listener echo interference from the input to provide a listener echo corrected output. The LECR of FIG. 2A further includes a bulk delay line unit (205), operably coupled to receive the listener echo corrected output, for providing a bulk delay line output to the listener echo interference estimator unit. Further description of a typical listener echo estimator unit and a bulk delay line unit are set forth below.

FIG. 2B is a block diagram of a second embodiment of the present invention, illustrating a feedforward implementation of a listener echo canceller (LECR). An interference cancelling unit (211), operably coupled to receive input to a listener echo canceller and an estimate of a listener echo interference from an adaptive listener echo interference estimator unit (209), subtracts the estimate of the listener echo interference from the sampled input to provide a listener echo corrected output. The LECR of FIG. 2B further includes a bulk delay line unit (207), operably coupled to receive the sampled input, for providing a bulk delay line output to the listener echo interference estimator unit. Further description of a typical listener echo estimator unit and a bulk delay line are set forth below.

FIG. 2C is a block diagram of a third embodiment of a device of the present invention for minimizing a listener echo signal interference in a demodulated, equalized communication signal received over a channel having simultaneous transmission and reception. The device comprises an equalizing unit (202), a first correcting unit (204), and a second correcting unit (208). The equalizing unit (202) receives the demodulated, where desired, communication signal and provides an equalized signal to the first correcting unit (204). the first correcting unit (204), operably coupled to the equalizing unit (202) and to the second correcting unit (208), receives the equalized signal from the equalizing unit (202), provides a listener echo estimate with a proper phase correction utilizing a phase-tracking device, corrects the equalized signal in accordance with that listener echo estimate, and provides a first corrected signal to the the second correcting unit (208). The second correcting unit (208) is operably coupled to the first correcting unit (204) and is configured for providing a phase correction to the first corrected signal, outputting a second corrected signal to the decoder, providing an error signal to the equalizing unit (202) for updating the equalizer coefficients and to the first correcting unit (204) for updating the listener echo estimator coefficients, and, where desired, providing a reference signal to the first correcting unit (204) in the reference directed training mode for training the listener echo estimator and the phase-tracking device.

FIGS. 2D and 2E are basic signal-path block diagrams of underlying exemplary first and second operation modes, respectively, of the third embodiment of the device of the present invention. An error signal provided by a second correcting unit (224) to the equalizer unit (210) and to the first correcting unit (212) for updating the equalizer unit (210) and listener echo estimator coefficients is not illustrated. FIG. 2D sets forth a block diagram of the device of the present invention in an exemplary data receiving linear feedback implementation wherein an input to a listener echo estimator (220) is provided via a linear feedback configuration. An equalizer unit EQ (210) is coupled to receive a demodulated communication signal. The first correcting unit (212) is operably coupled to the equalizer unit (210) and to the second correcting unit (224), and comprises a listener echo estimator LEE (220) with a switch S1 (222) for selecting an input signal to the LEE (220) in different operation modes, a listener echo phase correction unit LEPC (216) and a combining unit (214) that substantially obtains a difference between the equalized demodulated communication signal and the phase-corrected listener echo estimate for providing a first corrected signal to the second correcting unit (224). The second correcting unit (224) includes a received data phase correction unit (226) to provide phase correction to the first corrected signal from the first correcting unit (212) and output the second corrected signal u to a decoder. In FIG. 2D, the device is in a communication data receiving mode. The switch S1 (222) selects z, an output of the combining unit (214) as an input to the LEE (220). Hence, the first correcting unit (212) operates in a linear feedback mode.

FIG. 2E sets forth a block diagram of the device of the present invention in an exemplary linear feedback listener echo cancelling implementation with a reference-directed training mode. In such an operation mode, a switch S2 (232) in the second correcting unit (224) selects a reference signal as signal v, the reference signal being a predetermined data signal transmitted by a remote modem in a reference-directed training period and being known by a local modem receiver. Signal v is phase-rotated in a received data phase correction inverse unit RDPCI unit (230) that performs an inverse operation of that of a received data phase correction unit RDPC (226), the RDPCI unit (230) outputting signal d. Signal d is selected by the switch S1 (222) in the first correcting unit (212) as an input to the LEE (220).

FIG. 3 is a block diagram setting forth an exemplary embodiment of a linear feedback configuration implementation of the device of the present invention. The device minimizes listener echo signal interference in a demodulated, where desired, communication signal received over a channel having simultaneous transmission and reception, the device comprising an equalizing unit (302), operably coupled to receive the demodulated, where desired, communication signal, for providing an equalized signal; a first correcting unit (304), operably coupled to the equalizing unit (302) and to a second correcting unit (308), and being configured for receiving the equalized signal; determining a phase-corrected listener echo estimate; and combining the equalized signal with the phase-corrected listener echo estimate to provide a first corrected signal; wherein the second correcting unit (308) is operably coupled to the first correcting unit (304) and to the equalizing unit (302), and is configured for at least: receiving the first corrected signal, providing a phase correction to the first corrected signal to generate a second corrected signal that is output to a decoder, providing an error signal to the equalizing unit (302) for updating coefficients of the equalizing unit (302) and to the first correcting unit (304) for updating coefficients of the LEE (320), and providing, where a reference-directed training mode is selected, a reference signal as an input signal to the LEE (320) in the first correcting unit (304).

In the exemplary embodiment of the linear feedback configuration implementation, FIG. 3, the first correcting unit (304) includes a primary combining unit (310), operably coupled to the equalizing unit (302) and to a listener echo phase correcting unit LEPC (316) that provides a phase-corrected listener echo estimate $e_L$, for obtaining a difference between an equalized signal q and the phase-corrected listener echo estimate $e_L$, being the first corrected signal z; a first switching unit S1 (322), operably coupled to the primary combining unit (310) and to a second correcting unit (308), for selecting, as desired, one of:

for a data receiving mode, a linear feedback signal z that is an equalized, listener echo estimate corrected signal, and for a reference-directed training mode, a phase-rotated reference signal d;

a listener echo estimating unit LEE (320) having LEE coefficients, being operably coupled to the first switching unit (S1) for utilizing the selected signal to determine a first listener echo estimate and operably coupled to a listener echo phase correction inverse unit LEPCI (318) that provides a rotated error signal, for utilizing the rotated error signal to update the LEE coefficients; wherein the listener echo phase correction unit LEPC (316) is operably coupled to the listener echo estimating unit LEE (320) and to a listener echo phase-locked loop unit LEPLL (314) for providing a phase correction to the listener echo estimate and for generating a phase-corrected listener echo estimate $e_L$ to the primary combining unit (310) and is responsive to a controlled input of the LEPLL (314); and a listener echo phase error determining unit LEPE (312), operably coupled to the equalizing unit and to the listener echo phase correcting unit LEPC (316), for utilizing the equalized signal q and the phase-corrected listener echo estimate $e_L$ to provide a listener echo phase error θ to the LEPLL (314); wherein the listener echo phase-locked loop unit LEPLL (314) is operably coupled to the listener echo phase error determining unit LEPE (312) for tracking a correct phase of a listener echo based on θ and for providing a phase correction ψ to the LEPC (316) and to the LEPCI (318); and wherein the listener echo phase correction inverse unit LEPCI (318) is operably coupled to the listener echo phase-locked loop unit LEPLL (314) and to the second correcting unit (308) that provides the error signal ε, for rotating the error signal ε from the second correcting unit in accordance with the LEPLL phase correction ψ to provide a rotated error signal η for updating coefficients of the LEE (320).

In the above embodiment the second correcting unit typically includes: a received data phase correcting unit RDPC (324), operably coupled to the first correcting unit (304) and to a received data phase-locked loop unit RDPLL (330), for providing a data signal phase correction to the first corrected signal z and utilizing that data phase correction to generate a second corrected signal u for outputting to a decoder; a preliminary decision unit (PD) (328), operably coupled to the received data phase correcting unit RDPC (324), for generating an output signal w in accordance with the second corrected signal u, w being a preliminary estimate of a data signal transmitted by a remote modem; a second switching unit (S2), operably coupled to the preliminary decision unit PD (328) and to a reference signal unit (REFERENCE) having a reference signal, for selecting one of: for a data receiving mode, the preliminary decision output signal w, and for a reference-directed training mode, a predetermined reference signal r, as a decision signal v; a received data phase error unit RDPE (328), operably coupled to the received data phase correcting unit RDPC (324) and to the second switching unit S2 (336), for substantially determining a received data phase error α in accordance with signal u and v; a received data phase-locked loop unit RDPLL (330), operably coupled to the received data phase correcting unit RDPC (324) and to a received data phase correction inverse unit RDPCI (332), for tracking a phase of a received data signal and providing a phase correction estimate φ(n) to the RDPC (324) and to the RDPCI (332) in accordance with α; the received data phase correction inverse unit RDPCI (332) being operably coupled to the received data phase-locked loop unit RDPLL (330) and to the second switching unit S2 (336), for performing an inverse operation of the RDPC to provide a phase rotation on decision signal v that generates a rotated decision signal d; and a second combining unit (334), operably coupled to the received data phase correction inverse unit and to the first correcting unit, for subtracting the first corrected signal z from d to provide an error signal ε(n) to the equalizing unit (302) for updating equalizer unit coefficients and to the first correcting unit (304) for updating LEE coefficients after phase rotation in the LEPCI. The second combiner is typically an adder.

Figure 4:
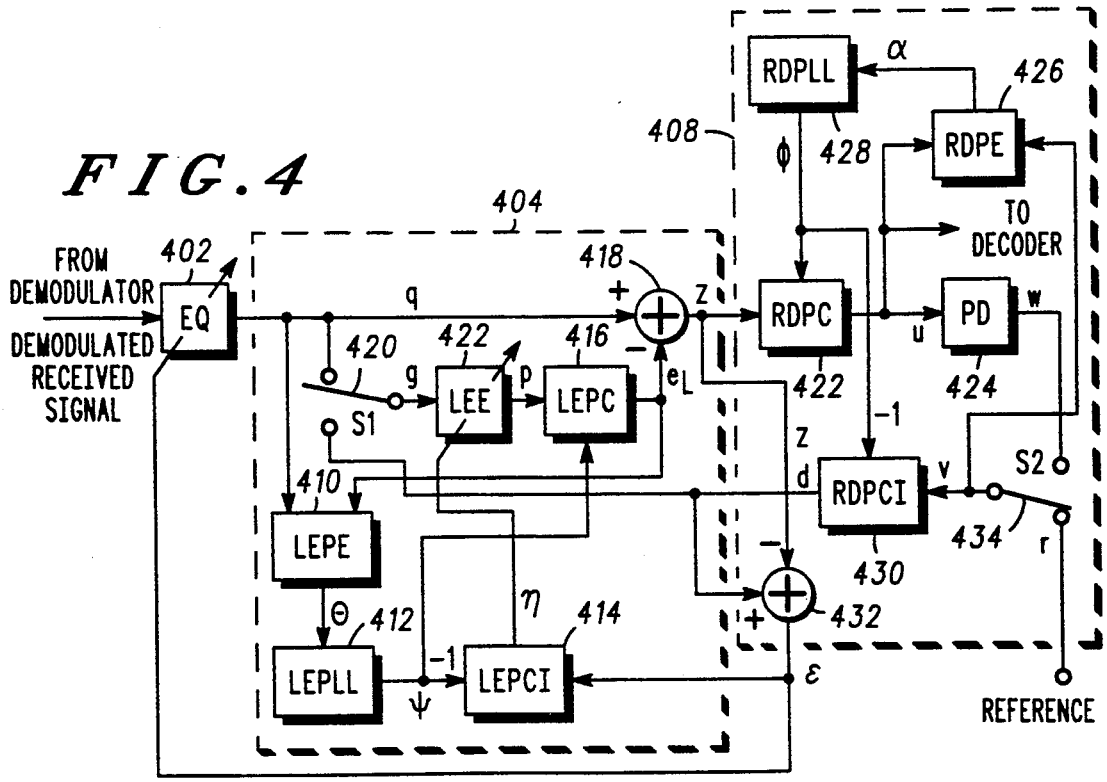
FIG. 4 is a block diagram setting forth an exemplary embodiment of the linear feedforward configuration implementation of the device of the present invention.

FIG. 4 is a block diagram setting forth an exemplary embodiment of a linear feedforward configuration implementation of the device of the present invention. The exemplary embodiment in FIG. 4 is similar to that in FIG. 3, except that the first switching unit S1 (420) selects the equalized signal q instead of the first corrected signal z as the input to the LEE (422). Thus, in this exemplary embodiment, an equalizing unit (402) is utilized also, and the first correcting unit (404) includes: a first adding unit (418), operably coupled to the equalizing unit (402) and to a listener echo phase correcting unit LEPC (416) that provides at least a phase-corrected listener echo estimate, for substantially obtaining a difference between the equalized signal and that listener echo estimate, being the first corrected signal; a switching unit S3 (420), operably coupled to the equalizing unit (402) and to the second correcting unit (408), wherein the second correcting unit (408) provides a rotated reference signal, for selecting, as desired, one of: the equalized signal, and the rotated reference signal, as a selected signal; a listener echo estimating unit LEE (422) having LEE coefficients, operably coupled to the switching unit S3 (420) for utilizing the selected signal to determine a listener echo estimate, and to a listener echo phase correction inverse unit LEPCI (414) that provides a rotated error signal, for utilizing the rotated error signal to update the LEE coefficients; wherein the listener echo phase correcting unit LEPC (416) is operably coupled to the listener echo estimating unit LEE (422) and to a listener echo phase-locked loop unit LEPLL (412) that provides a listener echo phase correction estimate, for substantially rotating the listener echo estimate of the LEE in accordance with the listener echo phase correction estimate to determine at least a phase-corrected listener echo estimate; a listener echo phase error determining unit LEPE (410), operably coupled to the equalizing unit (402) and to the listener echo phase correcting unit LEPC (416), for utilizing the equalized signal and the listener echo estimate to provide a listener echo phase error; wherein the listener echo phase-locked loop unit LEPLL (412) is operably coupled to the listener echo phase error determining unit LEPE (410), for utilizing the listener echo phase error to provide a listener echo phase correction estimate; and wherein the listener echo phase correction inverse unit LEPCI (430) is operably coupled to the listener echo phase-locked loop unit LEPLL (412) and to the second correcting unit (408) that provides an error signal, for utilizing the listener echo phase correction estimate and the second correcting unit error signal for providing a rotated error signal for updating the listener echo estimating unit. The second correcting unit (408) typically is that described above.

The equalizing unit, having equalizing coefficients, is implemented utilizing known techniques. Typically a baseband adaptive equalizer may be used where an input is a demodulated baseband signal, as is illustrated in the figures described above. A passband adaptive equalizer may be used where an input is a modulated passband signal. In the latter case, a demodulator follows the equalizer. A least means square (LMS) algorithm is typically used for updating the coefficients of the equalizer.

The listener echo estimating unit LEE in FIGS. 3 and 4 (320, 422) is further illustrated in FIG. 5. Typically, the LEE includes: a bulk delay line (BD) (502), operably coupled to the first switching unit S1 (322, 420), for providing a delay in accordance with $B_L$, a listener echo bulk delay relative to a received data signal; and an adaptive transversal filter (504), operably coupled to BD (502), whose coefficients are $a_k(n)$, where $k=0, 1, 2, \ldots, M-1$, where M is a number of taps in the transversal filter unit, and whose output is $$p(n) = \sum_{k=0}^{M-1} g(k + n + B_L)a_k(n),$$

where n is a discrete time index and g() is input from the first switching unit. The delay $B_L$, where desired, is determined by a talker far echo delay measuring method, based on the proposition that, both the listener echo delay and the talker far echo delay being actually substantially equal to a communication round trip delay, the said delays are substantially equal to each other.

Figure 7:
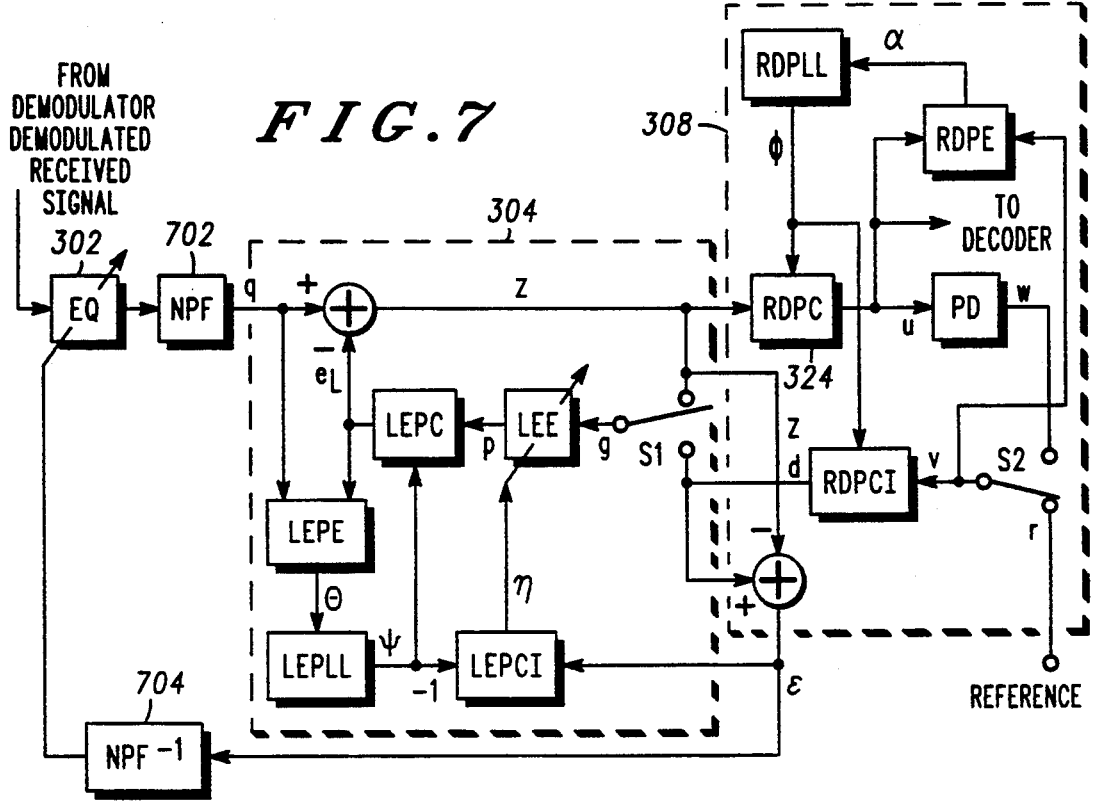
FIG. 7 is an exemplary embodiment of a device of the present invention having a linear feedback configuration with precoding.

Devices such as modems may include trellis precoding technique, where desired, as illustrated in FIG. 6, wherein a local modem A communicates with a remote modem B. Thus, in another embodiment, illustrated in FIG. 7, of a linear feedback listener echo canceller of the present invention wherein precoding is utilized, there is further included a noise prediction filter NPF (702), operably coupled between the equalizing unit (302) and the first correcting unit (304), to receive and filter the demodulated, equalized received communication signal, so that a spectrum of noise in the demodulated, equalized communication signal is whitened; and an inverse noise prediction filter $NPF^{-1}$ (704), operably coupled between the second correcting unit (308) and the equalizing unit (302), for filtering an error signal $\epsilon(n)$ of the second correcting unit to provide an adjusted error for updating equalizer coefficients.

Figure 8:
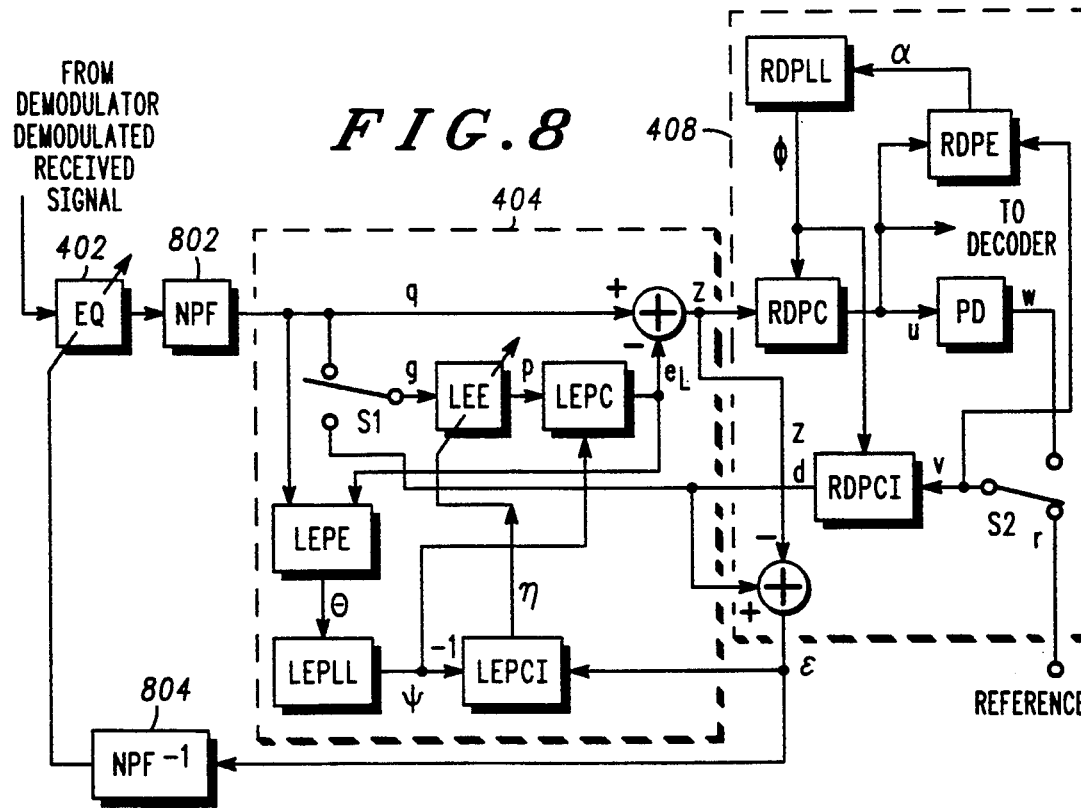
FIG. 8 is an exemplary embodiment of a device of the present invention having a linear feedforward configuration with precoding.

Similarly, in an embodiment, illustrated in FIG. 8, of a linear feedforward listener echo canceller of the present invention where trellis precoding is utilized, a noise prediction filter NPF (802) and an inverse noise prediction filter $NPF^{-1}$ (804) are included in a fashion similar to that described above for FIG. 7.

The listener echo cancelling device of the present invention is typically implemented in a modem utilized for communicating with a remote device in both directions over a channel, described as above.

Exemplary determinations described above are more particularly set forth below, wherein the following terminology is utilized: an equalized signal is q(n), n being the discrete time index; a rotated error signal is $\eta(n)$; a phase-corrected listener echo estimate is $e_L(n)$; a first corrected signal is z(n); a first listener echo estimate is p(n); and an error signal is $\epsilon(n)$; a received communication signal phase error is $\alpha(n)$; a received communication signal phase correction estimate is $\phi(n)$; a remote transmitted communication signal estimate is v(n), being one of: a known reference signal r(n) for selection of a reference-directed training mode, and a preliminary decision of the remote transmitted communication signal communication signal w(n); a phase-rotated decision signal is d(n);

The phase-corrected listener echo estimate is of a form: $e_L(n) = p(n)e^{j\psi(n)}$, where n is a discrete time index, p(n) is a first listener echo estimate, and $\psi(n)$ is a listener echo phase correction estimate. The first corrected signal z(n) is determined as a difference between q(n) and $e_L(n)$: $z(n) = q(n) - e_L(n)$, where q(n) is the equalized signal.

Figure 9:
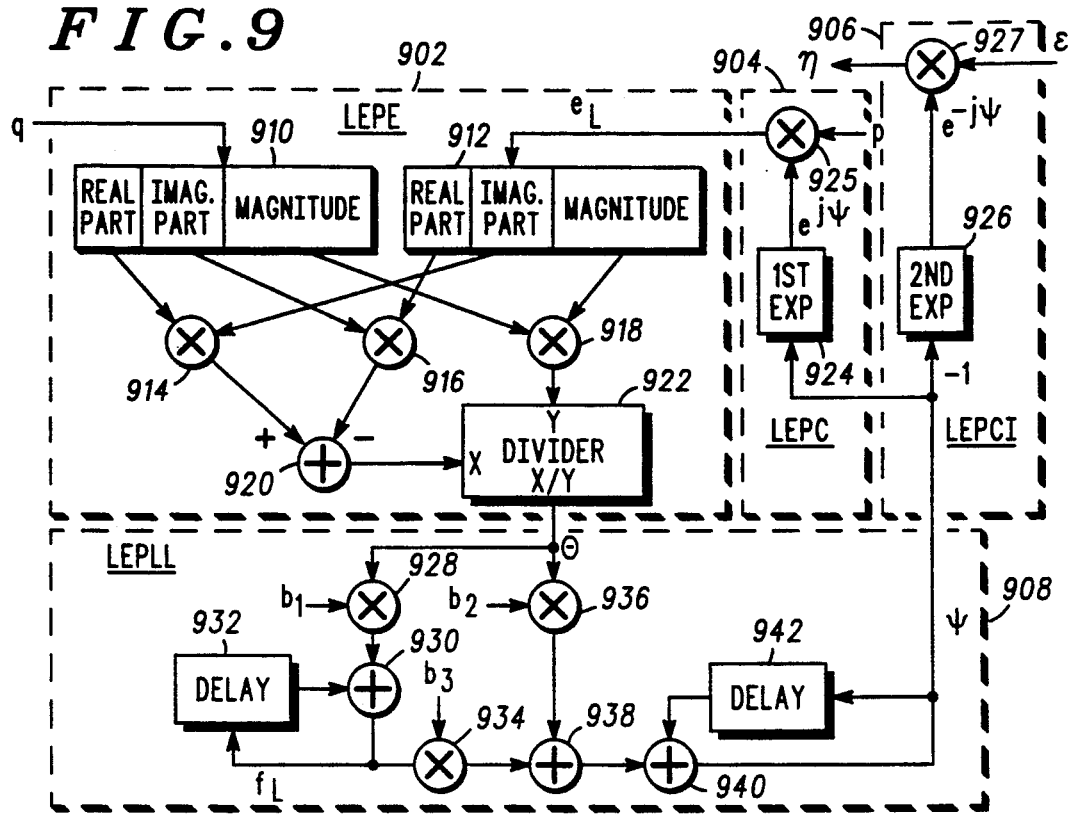
FIG. 9 is a block diagram of setting forth exemplary embodiments of a listener echo phase estimating unit (LEPE), a listener echo phase-lock loop unit (LEPLL), a listener echo phase correcting unit (LEPC), and a listener echo phase correction inverse unit (LEPC)I of FIGS. 3 and 4.

An exemplary embodiment of a phase correcting device in the first correcting unit is set forth in FIG. 9, wherein the units LEPE (902), LEPLL (904) and LEPCI (906) are included. The LEPE (920) determines a listener echo phase error $\theta(n)$, a phase difference between the equalized signal q(n) and the phase-corrected listener echo estimate $e_L(n)$, utilizing a typical method of determining phase differences between two signals as is known in the art (for example, as in U.S. Pat. No. 4,813,073 and in U.S. Pat. No. 4,987,569):

$$\theta(n) \approx \frac{e_{Lr}(n)q_i(n) - e_{Li}(n)q_r(n)}{|q(n)||e_L(n)|},$$

where $e_{Lr}$ and $e_{Li}$ are the real and imaginary parts, respectively, of $e_L(n)$, and $q_r$ and $q_i$ are the real and imaginary parts, respectively, of the equalized signal q(n).

The exemplary embodiment of the LEPE (902), FIG. 9, includes a first device (910) that provides a real part $q_r(n)$, an imaginary part $q_i(n)$, and a magnitude of q(n) and a second device (912) that provides a real part $e_{Lr}(n)$, an imaginary part $e_{Li}(n)$, and a magnitude of $e_L(n)$, first and second multipliers (914, 916) operably coupled to the first and second devices, for providing the products $e_{Lr}(n)q_i(n)$ and $e_{Li}(n)q_r(n)$, a first adder (920) operably coupled to the first and second multipliers determines a difference $e_{Lr}(n)q_i(n) - e_{Li}(n)q_r(n)$, a third multiplier (918) operably coupled to the first device and to the second device provides $|q(n)||e_L(n)|$, and a first divider (922) provides $\theta(n)$.

With the configuration in the present invention, the LEPC unit compensates only the listener echo frequency offset relative to the received data signal, which is generally much smaller than the total frequency offset, making compensation easier to achieve.

In this embodiment the listener echo phase locked loop LEPLL (980) is implemented as a typical second order digital phase locked loop as is known in the art, for example, as described in U.S. Pat. No. 4,813,073 and U.S. Pat. No. 4,987,569, wherein a listener echo frequency offset relative to the received data signal $f_L$ and a listener echo correction $\psi(n)$ are determined recursively utilizing the listener echo phase error $\theta(n)$ obtained in the LEPE:

a phase-locked loop of the first correcting unit determines an estimate of $f_L$ and a phase correction estimate for p(n+1), wherein, $$f_L(n+1) = f_L(n) + b_1\theta(n), \text{ and}$$

$$\psi(n+1) = \psi(n) + b_2\theta(n) + b_3f_L(n+1),$$

where $b_1$, $b_2$, and $b_3$ are constants that determine a phase-locked loop characteristic.

Based on the proposition that $f_L$ is substantially equal to a talker far echo frequency offset $f_F$, as soon as an estimate of $f_F$ is available, for example, using the method described in U.S. Pat. No. 4,987,569, that estimate of $f_F$ may be utilized to initialize an estimate of $f_L$ in the LEPLL. This initialization scheme facilitates an initial convergence of the LEPLL.

In the exemplary embodiment illustrated in FIG. 9, the listener echo phase-locked loop LEPLL (980) includes a third multiplier (928), operably coupled to first divider (922) of the LEPE (902) that multiplies the listener echo phase error $\theta(n)$ by a first constant $b_1$ to provide $b_1\theta(n)$, a fourth multiplier (936), coupled to the first divider (922) of the LEPE (902), that multiplies $\theta(n)$ by a second constant $b_2$ to provide $b_2\theta(n)$, a second adder (930), operably coupled to the third multiplier (928) and to a first delay unit (932), that substantially adds $b_1\theta(n)$ to a current estimate of $f_L$ to provide an updated estimate of $f_L$ which is then stored in the first delay unit (932), and is multiplied by a third constant $b_3$ utilizing a fifth multiplier (934) that is operably coupled to the second adder (930) to provide a fifth multiplier output. A third adder (938), operably coupled to receive the fifth multiplier output and $b_2\theta(n)$ is utilized for adding same to $b_2\theta(n)$ to provide a third adder output. A fourth adder (940), operably coupled to receive the third adder output and a second delay unit (942) output, is utilized to add the third adder output to a current value of $\psi(n)$ to generate an updated value of $\psi(n)$ that is stored in the second delay unit (942) and is further transmitted to the LEPC (904) and to the LEPCI (906). The second delay unit is operably coupled to provide the current value of $\psi(n)$ to the fourth adder (940).

A second approach (not shown) may also be used to implement the LEPLL. $\psi(n)$ is determined based on the sign of $q(n)$, $s(n)$:

$$s(n) = \text{sign}[q(n)] = \text{sign}[e_{LI}(n)q_r(n) - e_{Lr}(n)q_I(n)],$$

defining $$s(n) = 1 \text{ for } e_{LI}(n)q_r(n) - e_{Lr}(n)q_I(n) > TH,$$

$$s(n) = -1 \text{ for } e_{LI}(n)q_r(n) - e_{Lr}(n)q_I(n) < -TH, \text{ and}$$

$$s(n) = 0;$$

otherwise, where TH is a small predetermined positive threshold value; and determining $$f_L(n+1) = f_L(n) + d_1 s(n), \text{ and}$$

$$\psi(n+1) = \psi(n) + d_2 s(n) + b_3 f_L(n+1),$$

where $d_1$ and $d_2$ are selected constants and $f_L(n)$, where desired, is initialized using a talker far echo frequency offset estimate to facilitate an initial convergence. The second approach is computationally more efficient than the first approach. An initial convergence utilizing the second approach is facilitated by an appropriate initialization scheme using the talker far echo frequency offset estimate.

An exemplary embodiment of the LEPC (904), utilized to determine $e_L(n)$, is set forth in FIG. 9, wherein, upon input of $\psi(n)$ from the LEPLL (908), a first unit (1ST EXP) (924) for providing powers of e provides $e^{j\psi(n)}$ to a sixth multiplier (925) that is operably coupled to the 1ST EXP (924) and to receive $p(n)$, for substantially multiplying $e^{j\psi(n)}$ and $p(n)$ to obtain $e_L(n)$: $e_L(n) = p(n)e^{j\psi(n)}$.

An exemplary embodiment of the LEPCI (906), utilized to determine $\eta(n)$, is set forth in FIG. 9, wherein, upon input of $\psi(n)$ from the LEPLL (908), a second unit (2ND EXP) (926) for providing powers of e provides $e^{-j\psi(n)}$ to a seventh multiplier (927) that is operably coupled to the 2ND EXP (924) and to receive $\epsilon(n)$, for substantially multiplying $e^{-j\psi(n)}$ and $\epsilon(n)$ to obtain $\eta(n)$: $\eta(n) = \epsilon(n)e^{-j\psi(n)}$.

$\eta(n)$ is utilized to update the listener echo estimator (LEE) coefficients, typically according to an LMS-type algorithm:

$$a_k(n+1) = a_k(n) + \delta\eta(n)g(n+B_L+k), k=0, 1, \ldots, M-1,$$

where $\delta$ is a small adaptation constant and M is a number of taps in the LEE.

Received data phase correction may be implemented using known phase correction techniques (for example, as described in U.S. Pat. No. 4,813,073). An exemplary embodiment of a received data phase error determining unit (RDPE) (1002), a received data phase-locked loop (RDPLL) (1008), a received data phase correction unit (RDPC) (1004), and a received data phase correction inverter unit (RDPCI) (1006) of FIGS. 3 and 4 is set forth in FIG. 10. The RDPE (1002) is utilized to determined a phase error $\alpha(n)$ using signals $v(n)$ and $u(n)$ such that:

$$\alpha(n) \approx \frac{v_r(n)u_I(n) - u_r(n)v_I(n)}{|v(n)|^2},$$

where $v_r(n)$ and $v_I(n)$ are real and imaginary parts, respectively, of $v(n)$, and $u_r(n)$ and $u_I(n)$ are real and imaginary parts, respectively, of $u(n)$. A third device (1010) provides a real part $v_r(n)$, an imaginary part $v_I(n)$, and a magnitude of $v(n)$, and a second device (1012) provides a real part $u_r(n)$, an imaginary part $u_I(n)$, and a magnitude of $u(n)$, eighth and ninth multipliers (1014, 1016) operably coupled to the first and second devices, provide the products $u_I(n)v_r(n)$ and $u_r(n)v_I(n)$, a fifth adder (1018), operably coupled to the eighth and ninth multipliers, determines a difference $u_I(n)v_r(n) - u_r(n)v_I(n)$, a square unit (1020) operably coupled to the third device, provides $|v(n)|^2$, and a second divider (1022) operably coupled to the square unit (1020) provides $\alpha(n)$. Alternatively, a prestored table of $1/|v(n)|^2$ may be employed, allowing replacement of the second divider (1022) by a look-up table together with an associated multiplier.

In the above embodiment, the received data phase-locked loop RDPLL (1008) is implemented as a typical second-order digital phase-locked loop as, for example, in U.S. Pat. No. 4,813,073, wherein an estimate of a received data frequency offset $f_D$ and a received data phase correction $\phi(n)$ are determined recursively utilizing the received data phase error $\alpha(n)$ obtained in the RDPE (1002), as set forth below:

$$f_D(n+1) = f_D(n) + c_1\alpha(n); \text{ such that}$$

$$\phi(n+1) = \phi(n) + c_2\alpha(n) + c_3 f_D(n+1),$$

where $c_1$, $c_2$, and $c_3$ are constants that determine a desired phase-locked loop characteristic.

Figure 10:
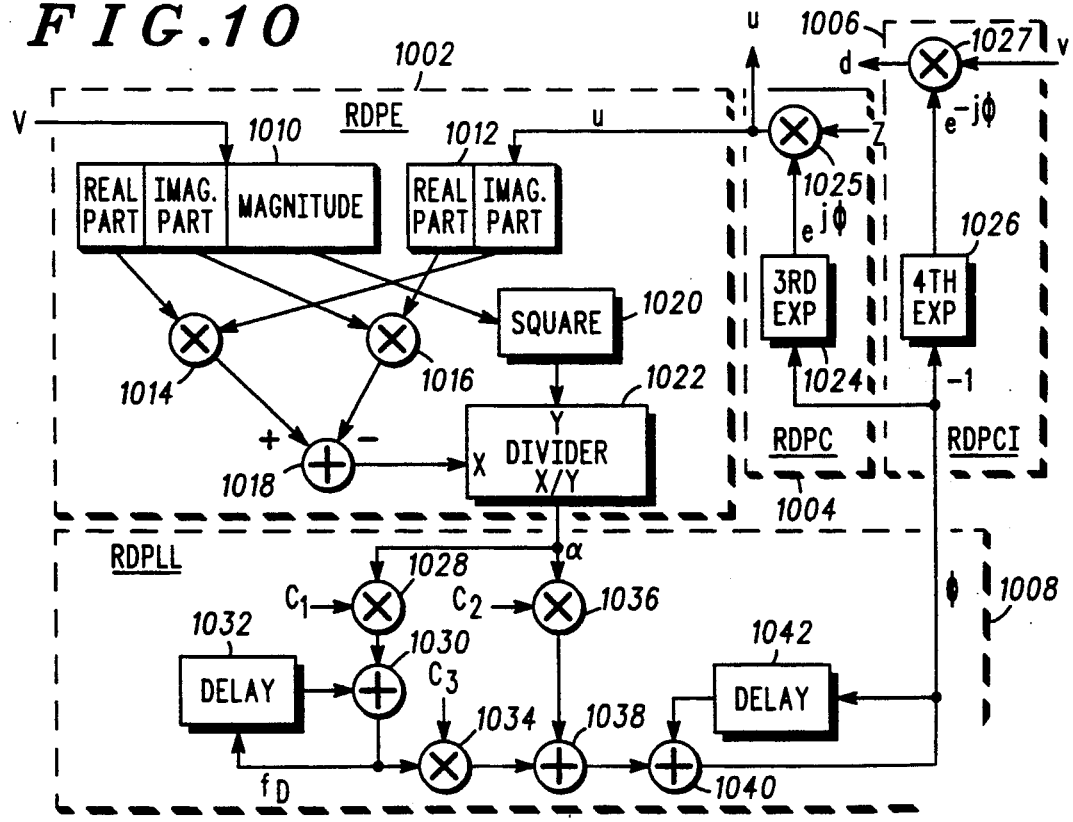
FIG. 10 is a block diagram setting forth exemplary embodiments of a received data phase estimating unit (RDPE), a received data phase-locked loop unit (RDPLL), a received data phase correcting unit (RDPC), and a received data phase correction inverse unit (RDPCI) of FIGS. 3 and 4.

In the exemplary embodiment, FIG. 10, a received data phase error determining unit RDPE (1002), a received data phase-locked loop RDPLL (1008), a received data phase correcting unit RDPC (1004), and an RDPCI (1006) of FIGS. 3 and 4 are included. The RDPLL (1008) includes a tenth multiplier (1028), operably coupled to a second divider (1022) of the RDPE (1002) that multiplies the phase error $\alpha(n)$ by a fourth constant $c_1$ to provide $c_1\alpha(n)$, an eleventh multiplier (1036), coupled to the second divider (1022) of the RDPE (1002), that multiplies $\alpha(n)$ by a fifth constant $c_2$ to provide $c_2\alpha(n)$, a sixth adder (1030), operably coupled to the tenth multiplier (1028) and to a third delay unit (1032), that adds $c_1\alpha(n)$ to a current estimate of $f_D$ to provide an updated estimate of $f_D$ which is then stored in the third delay unit (1032), and is multiplied by a sixth constant $c_3$ utilizing a twelfth multiplier (1034) that is operably coupled to the sixth adder (1030) to provide a twelfth multiplier output. A seventh adder (1038), operably coupled to receive the twelfth multiplier output and $c_2\alpha(n)$, is utilized for adding same to $c_2\alpha(n)$ to provide a seventh adder output. A eighth adder (1040), operably coupled to receive the seventh adder output and a fourth delay unit (1042) output, is utilized to add the seventh adder (1038) output to a current value of $\phi(n)$ to generate an updated value of $\phi(n)$ that is stored in the fourth delay unit (1042) and is further transmitted to the RDPC (1004) and to the RDPCI (1006). The fourth delay unit (1042) is operably coupled to provide the current value of $\phi(n)$ to the eighth adder (1040).

An exemplary embodiment of the RDPC (1004), utilized to determine u(n) is set forth in FIG. 10, wherein, for an input of $\phi(n)$, a third unit 3RD EXP (1024) for providing powers of e provides $e^{j\phi(n)}$ and a thirteenth multiplier (1025), operably coupled to the third unit 3RD EXP (1024) and to receive an input z(n), multiplies $e^{j\phi(n)}$ times z(n) to obtain u(n): u(n)=z(-n)$e^{j\phi(n)}$.

An exemplary embodiment of the RDPCI (1006), utilized to determine d(n) is set forth in FIG. 10, wherein, for an input of $\phi(n)$, a fourth unit 4TH EXP (1026) for providing powers of e provides $e^{-j\phi(n)}$ and a fourteenth multiplier (1027), operably coupled to the fourth unit 4TH EXP (1026) and to receive v(n), multiplies $e^{-j\phi(n)}$ times v(n) to obtain d(n): d(n)=v(n)$e^{-j\phi(n)}$.

d(n) is utilized to determine the error signal $$\epsilon(n) = d(n) - z(n),$$

which in turn is used to update the equalizer coefficients, typically according to the LMS algorithm. d(n) is also sent to the first correcting unit for updating the LEE coefficients after phase rotation in the LEPCI.

The method of the present invention (not illustrated) for minimizing a listener echo signal interference in a substantially demodulated, where desired, equalized communication signal received over a channel having simultaneous transmission and reception, the method the steps of: receiving the demodulated, where desired, communication signal, for providing an equalized signal utilizing an equalizing unit; determining a first listener echo estimate; providing an appropriate phase correction to the first listener echo estimate in a listener echo estimating unit; and combining the equalized signal with the phase-corrected listener echo estimate to provide at least a first corrected signal; selecting an appropriate signal in a different operational mode for the listener echo estimation; providing an error signal for updating the equalizing unit and listener echo estimating unit coefficients; providing a phase correction to the first corrected signal to generate a second corrected signal, and outputting the second corrected signal, the second corrected signal being a listener echo corrected and phase corrected communication signal.

The method typically further includes one of the following two approaches:

including the steps of: obtaining a difference between the equalized signal and the phase-corrected listener echo estimate, being the first corrected signal; selecting, as desired, one of: the first corrected signal, and a phase-rotated reference signal, as a first selected signal; utilizing the first selected signal to determine a first listener echo estimate; providing a phase correction to the listener echo estimate and obtaining a phase-corrected listener echo estimate; utilizing an equalized signal and the phase-corrected listener echo estimate to provide a listener echo phase error; utilizing the listener echo phase error to provide a listener echo phase correction estimate; providing an error signal and rotating the error signal based on the listener echo phase correction estimate to obtain a rotated error signal for updating the listener echo estimation; and including the steps of: providing at least the phase-corrected listener echo estimate and obtaining a difference between the equalized signal and the phase-corrected listener echo estimate, being the first corrected signal; selecting, as desired, one of: the equalized signal, and a phase-rotated reference signal, as a selected signal; utilizing this second selected signal to determine a first listener echo estimate; providing to the first listener echo estimate a phase correction and obtaining a phase-corrected listener echo estimate; utilizing the equalized signal and the phase-corrected listener echo estimate to provide a listener echo phase error; utilizing the listener echo phase error to provide a listener echo phase correction estimate; providing an error signal and rotating the error signal based on the listener echo phase correction estimate to obtain a rotated error signal for updating the listener echo estimate.

In addition to utilization of one of the two approaches set forth above, the method of the present invention typically further includes the steps of: determining a data phase correction and utilizing that data phase correction to provide a second corrected signal, being a listener echo corrected, phase corrected communication signal; providing a preliminary decision signal as a preliminary estimate of the data signal transmitted by a remote modem; selecting, as desired, one of: the preliminary decision signal and a known reference signal as a second selected signal; providing a received data phase correction estimate; providing a phase-rotation to the second selected signal to obtain a rotated decision signal; and substantially subtracting the first corrected signal from the rotated decision signal to obtain an error signal for equalization unit and listener echo estimating unit adaptation.

Also, the method of the present invention generally includes the following steps: utilizing a bulk delay unit to provide a delay in accordance with a listener echo bulk delay $B_L$; and utilizing a transversal filter unit whose coefficients are $a_k(n)$, where k=0, 1, 2, . . . , M−1, where M is a number of taps in the transversal filter unit, and whose output is substantially $$p(n) = \sum_{k=0}^{M-1} g(k + n + B_L) a_k(n),$$

where n is a discrete time index and g() is an output of the first switching unit. $B_L$ is, where desired, determined by a selected talker far echo ranging method.

Exemplary determinations of the listener echo estimate $e_L(n)$, the listener echo phase correction estimate $\psi(n)$, the first corrected signal z(n), the rotated error input $\eta(n)$, the received communication signal phase correction estimate $\phi(n)$, the data phase corrected communication signal u(n), the rotated decision signal d(n), and related values are understood to be in correspondence with the determinations described for the device as described above.

Alternatively, the method of the present invention may be selected to include the steps of: utilizing a noise prediction filter (NPF) receive and filter the equalized signal, so that a noise spectrum of the equalized signal is whitened; and utilizing an inverse noise prediction filter (NPF$^{-1}$) for filtering an error signal from the second correcting unit to provide a filtered error signal for updating equalizer coefficients.

Figure 11:
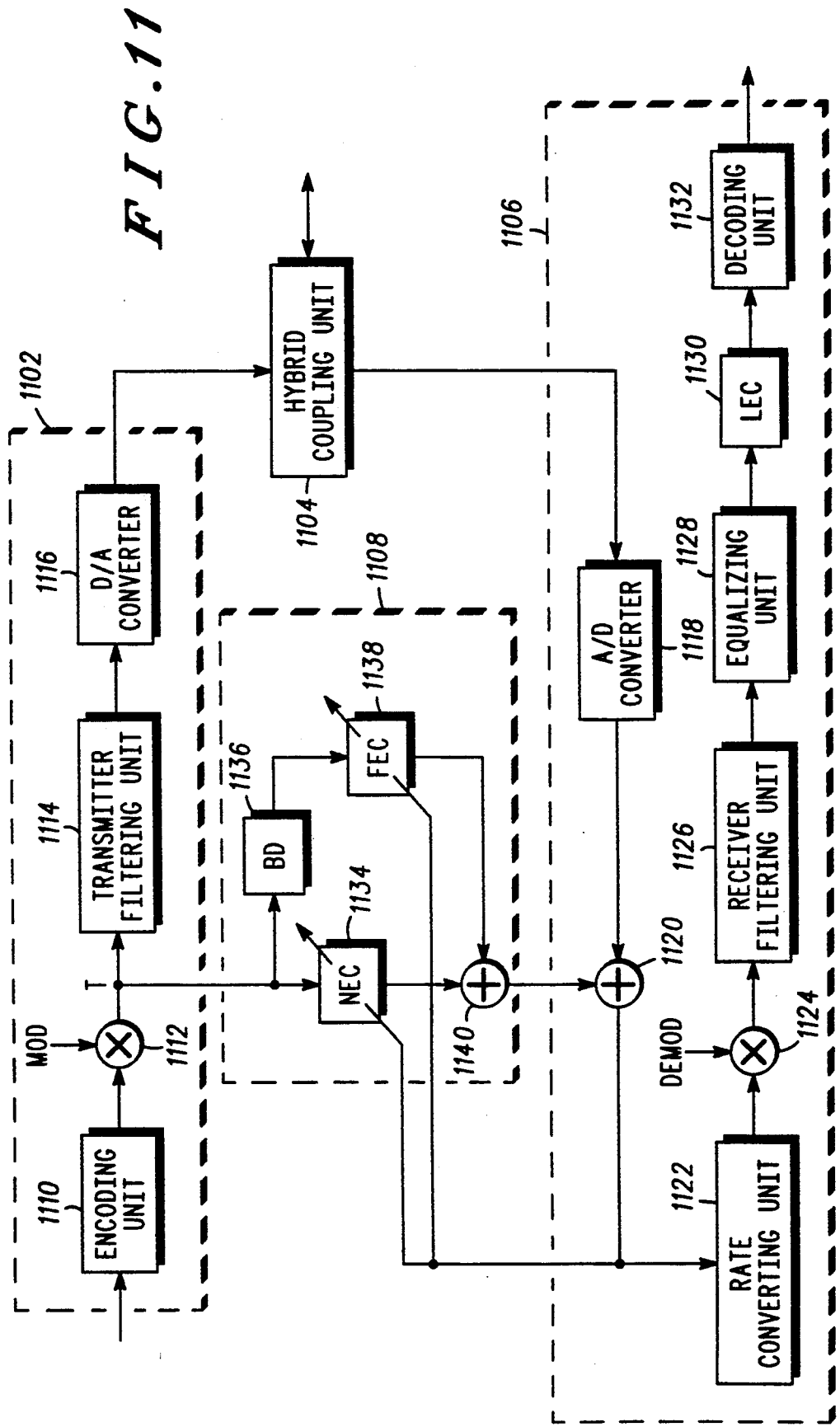
FIG. 11 is a block diagram setting forth an exemplary embodiment of a modem that includes a listener echo cancelling device in accordance with the present invention.

Clearly, in a preferred embodiment, the device of the present invention may be utilized in a modem. An exemplary modem utilizing the present invention is shown in FIG. 11. Such a modem typically has a talker echo cancelling device, the modem being utilized for communicating information with a remote device in both directions over a channel, the modem comprising: a transmission unit (1102), operably coupled to receive the information to be communicated, for preparing an analog signal which carries that information for transmission; a hybrid coupling unit (1104), operably coupled to the transmission unit and to a receiving unit (1106), for transmitting the analog signal and for receiving another analog signal from a remote device; a talker echo estimating unit (1108), operably coupled to the transmission unit (1102), for providing a talker echo estimate to the receiving unit (1106); and the receiving means (1106), operably coupled to the talker echo estimating unit (1108) and to the hybrid coupling unit (1104), for recovering information from the analog signal transmitted by the remote device.

The transmission means typically includes: an encoding unit (1110), operably coupled to receive information, for providing an encoded data signal; a modulating unit (1112), operably coupled to the encoding unit (1110), for providing a modulated encoded signal; a transmission (TX) filtering unit (1114), operably coupled to the first modulating unit (1112), for providing a modulated, filtered transmission digital signal at a desired sampling rate; a digital-to-analog converting unit (D/A) (1116), operably coupled to the transmission filtering unit (1114), for converting the modulated filtered transmission digital signal to an analog signal to provide to the hybrid coupling unit (1104). The receiving unit (1106) typically comprises: an analog-to-digital converting unit (A/D) (1118), operably coupled to the hybrid coupling unit (1104), for converting received analog signals to digital signals at a preselected sampling rate; a first combining unit (1120), operably coupled to the talker echo estimating unit (1108) and to the A/D unit (1118), for combining the received digital signal and the talker echo estimate to provide a first talker echo corrected signal; a rate converting unit (1122), where desired, operably coupled to the first combining unit (1120), for converting the first talker echo corrected signal, being sampled at a transmitter sampling clock, to a second talker echo corrected signal, being sampled at a desired receiver sampling clock; a demodulation unit (DEMOD) (1124), operably coupled to the rate converting unit (1122) for providing a demodulated second talker echo corrected signal; a receiving (RX) filtering unit (1126), operably coupled to the demodulation unit (1124), to receive the demodulated signal, for filtering the demodulated second talker echo corrected signal; an equalizing unit (1128), operably coupled to the receiving filtering unit (1126), for providing an equalized, demodulated, filtered, second talker echo corrected signal; a listener echo cancelling unit LEC (1130), operably coupled to the equalizing unit (1128), for providing a listener echo corrected, equalized, demodulated, filtered, second talker echo corrected signal; and a decoding unit (1132), operably coupled to the listener echo correcting unit (1142), for decoding the listener echo corrected, equalized, demodulated, filtered, second talker echo corrected signal to recover, the received information transmitted by the remote modem.

Typically, in the embodiment illustrated in FIG. 11, the talker echo estimating unit (1108) includes: a near echo correcting unit (NEC) (1134), operably coupled to the modulator (1112) and to the first combining unit (1120), for providing a near echo estimate as is known in the art; a bulk delaying unit (BD) (1136), operably coupled to the modulator (1112), for providing a desired bulk delay; a far echo correcting unit (FEC) (1138), typically including a phase-correcting unit to compensate a far echo frequency offset, operably coupled to the bulk delaying means (1136), for providing a phase-corrected far echo estimate as is known in the art; a second combining unit (1140), operably coupled to the near echo correcting unit (1134) and to the far echo correcting unit (1138), for combining the near echo estimate and the phase-corrected far echo estimate to provide the first talker echo estimate to the first combining unit (1120).

In the embodiment illustrated in FIG. 11, the listener echo correcting unit (1130) typically includes: a first correcting unit, operably coupled to the equalizing unit and to a second correcting unit, and being configured for: receiving the equalized, demodulated, filtered, second talker echo corrected signal; determining at least a listener echo estimate; and combining the equalized, demodulated, filtered, talker echo corrected signal with the listener echo estimate to provide a first corrected signal; wherein the second correcting means is operably coupled to the first correcting means and to the equalizing means, and is configured for: providing at least a phase correction to the first corrected signal to generate and output a second corrected signal that is an equalized, listener echo-corrected, and phase-corrected communication signal; providing an error signal to the equalizing means for adjusting an equalization process of the equalizing means, and to the first correcting means for adjusting the listener echo estimate; providing a rotated reference signal in reference-directed training mode for facilitating an initial training in a listener echo estimation. The listener echo cancelling unit of the modem is configured as described above, and functions as described above.

Although exemplary embodiments are described above, it will be obvious to those skilled in the art that many alternations and modifications may be made without departing from the invention. Accordingly, it is intended that all such alterations and modifications be included within the spirit and scope of the invention as defined in the appended claims.

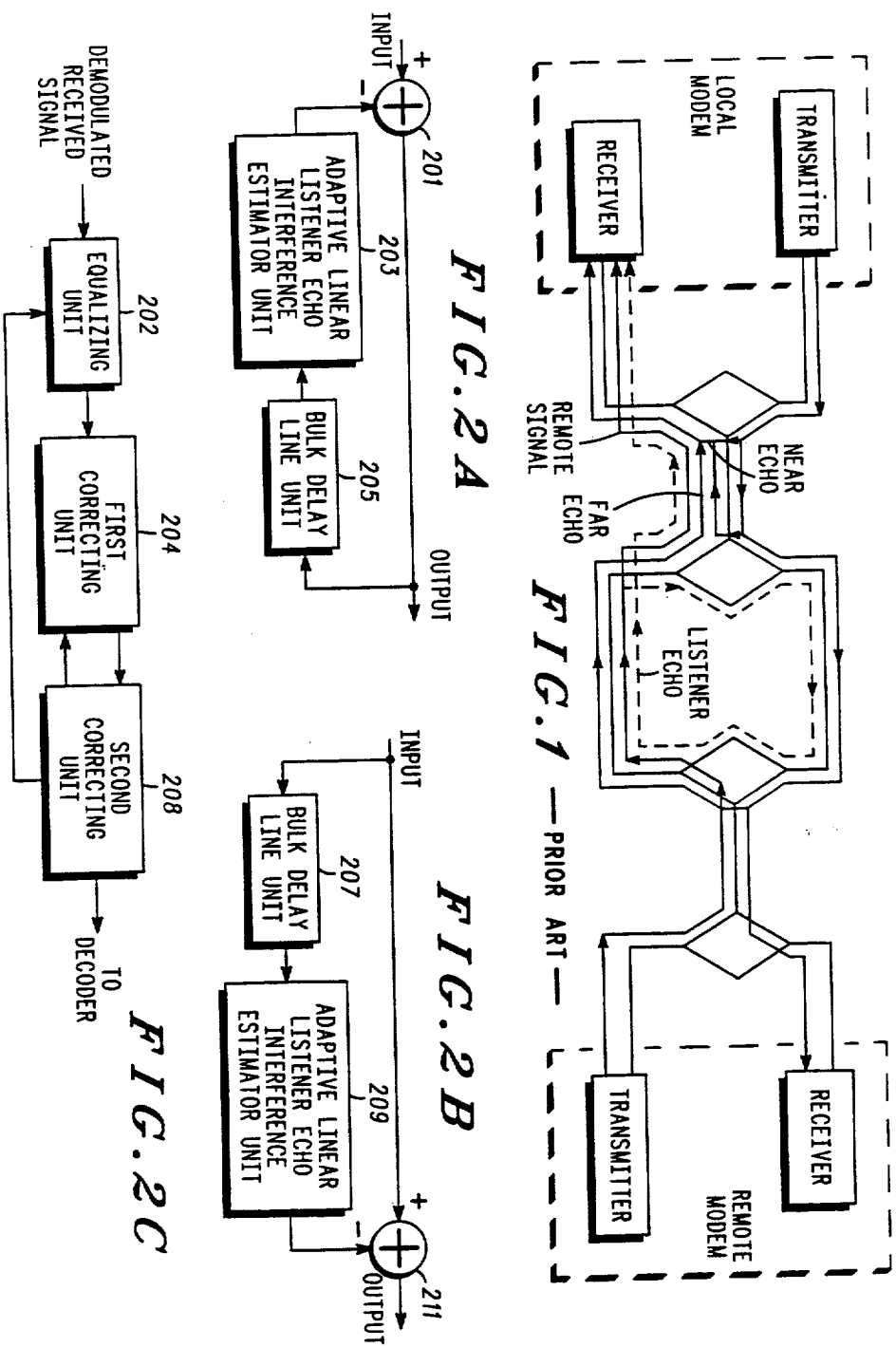

We claim:

1. A listener echo canceller (LECR) for reducing a listener echo interference in a digital communication system having a selected sampling interval, and having an input and an output, said input comprising a sum of a desired signal and a listener echo interference, and said output being free of listener echo interference, said listener echo canceller comprising:

a bulk delay line means, operably coupled to receive and store at least one sample of one of: the input and the output of said listener echo canceller, to provide a bulk delay line output;

an adaptive listener echo interference estimator means, operably coupled to receive the bulk delay line output for utilizing a listener echo bulk delay relative to the received data signal in place of a talker far echo bulk delay relative to the near echo to generate an estimate of the listener echo interference; and an interference cancelling means, operably coupled to receive the input of the listener echo canceller and the estimate of the listener echo interference, for producing said output by subtracting said estimate of the listener echo interference from said input of the listener echo canceller, wherein said adaptive listener echo interference estimator means further includes compensating means, operably coupled to receive the input of the LECR and to receive a phase-corrected listener echo estimate, for compensating a frequency offset in the said estimate of the listener echo interference utilizing a talker far echo frequency offset as an estimate of far echo cancellation, and wherein the means for compensating the frequency offset includes;

a phase-error estimating means, operably coupled to receive the input of the LECR and to receive a phase-corrected listener echo estimate, for generating a phase error that is a phase difference between the estimate of the listener echo estimate and the said input of the LECR; and a phase-locked loop, operably coupled to receive the said phase error, for generating a phase correction estimate; and a phase-correction means, operably coupled to receive the phase correction estimate, for generating a phase-corrected listener echo estimate.

2. The LECR of claim 1, wherein said adaptive listener echo interference estimator means further includes:

a set of filter coefficients and a tapped delay line, operably coupled to receive and store samples of said bulk delay line output; and wherein the said estimate of the listener echo interference is related to a weighted combination of the stored samples of said bulk delay line output such that the weighting is determined by the filter coefficients, and the said filter coefficients are adaptively adjusted to produce the estimate of said listener echo interference.

3. The LECR of claim 1, wherein the said bulk delay line output is one of:

the input of the LECR, delayed by a selected number of sampling intervals; and the output of the LECR, delayed by a selected number of sampling intervals; wherein said selected number of sampling intervals is non-zero.

4. The LECR of claim 1, wherein said adaptive listener echo interference estimator means further includes compensating means, operably coupled to receive the input of the LECR and to receive a phase-corrected listener echo estimate, for compensating a frequency offset in the said estimate of the listener echo interference.

5. The LECR of claim 4, wherein the means for compensating the frequency offset includes:

a phase-error estimating means, operably coupled to receive the input of the LECR and to receive a phase-corrected listener echo estimate, for generating a phase error that is a phase difference between the estimate of the listener echo estimate and the said input of the LECR; and a phase-locked loop, operably coupled to receive the said phase error, for generating a phase correction estimate; and a phase-correction means, operably coupled to receive the phase correction estimate, for generating a phase-corrected listener echo estimate.

6. A device for minimizing a listener echo signal interference in a selectively demodulated communication signal received over a channel having simultaneous transmission and reception, the device comprising;

equalizing means, operably coupled to receive the selectively demodulated communication signal, for providing an equalized signal;

a first correcting means, operably coupled to the equalizing means and to a second correcting means, and being configured for:

receiving the equalized signal;

determining a listener echo estimate; and combining the equalized signal with the listener echo estimate to provide a first corrected signal;

wherein the second correcting means is operably coupled to the first correcting means and to the equalizing means, and is configured for:

providing a phase correction to the first corrected signal to generate and output a second corrected signal that is an equalized listener echo corrected and phase-corrected communication signal;

providing an error signal to the equalizing means for adjusting an equalization process of the equalizing means and to the first correcting means for adjusting the listener echo estimation; and providing a rotated reference signal in reference-directed training mode for facilitating an initial training of a listener echo estimation.

7. The device of claim 6, wherein the first correcting means comprises:

(A) primary adding means, operably coupled to the equalizing means and to a listener echo estimating means together with a listener echo phase correcting means that provide a phase-corrected listener echo estimate, for obtaining a difference between the equalized signal and that listener echo estimate, being the first corrected signal;

(B) listener echo estimating means, operably coupled to one of:

the primary adding means in a linear feedback configuration, and the equalizing means in a linear feedforward configuration; and further being operably coupled to the second correcting means, for utilizing:

in a data-receiving mode, one of:
the first corrected signal, and
the equalized signal; and in a reference-directed training mode,
the rotated reference signal;
to determine a first listener echo estimate;

(C) listener echo phase error determining means, operably coupled to the listener echo phase correcting means and one of:

in the data-receiving mode,
the preliminary decision means, and in the reference-directed training mode,
a reference signal means,
for determining a listener echo phase error;

wherein the listener echo phase-locked loop means is operably coupled to the listener echo phase error determining means for utilizing the listener echo phase error to provide a listener echo phase correction estimate; and wherein the listener echo phase correction inverse means is operably coupled to the listener echo phase-locked loop means and to the second correcting means that provides an error signal, for utilizing the listener echo phase correction estimate and the second correcting means error signal for providing a rotated error signal for updating the listener echo estimating means.

8. The device of claim 7, further including that the second correcting means comprises:
 (A) received data phase correcting means, operably coupled to the first correcting means and to a received data phase-locked loop means, for determining a data phase correction and utilizing that data phase correction to provide a data phase corrected communication signal;
 (B) preliminary decision means, operably coupled to the received data phase correcting means, for providing a preliminary estimate of the communication signal transmitted by a remote modem;
 (C) received data phase error determining means, operably coupled to the received data phase correcting means and to one of:
  in the data-receiving mode,
   the preliminary decision means, and
  in the reference-directed training mode,
   the reference signal means,
  for determining a received data phase error $\alpha$;
 (D) received data phase-locked loop means, operably coupled to the received data phase correcting means and to a received data phase correction inverse means, for providing the received data phase correction estimate $\phi(n)$;
  the received data phase correction inverse means being operably coupled to the received data phase-locked loop means and to one of:
   the preliminary decision means, and
   the reference signal means,
  to provide a rotated decision signal;
 (E) a combiner, operably coupled to the received data phase correction inverse means and to the first correcting means, for subtracting the first corrected signal from the rotated decision signal to provide an error signal $\epsilon(n)$.

9. The device of claim 7, further including that the listener echo estimating means includes:
 a bulk delay line unit, operably coupled to one of:
  in the linear feedback configuration,
   the primary adding means, and
  in a linear feedforward configuration,
   the equalizing means,
 and further being operably coupled to the second correcting means, for providing a delay in accordance with a listener echo bulk delay $B_L$; and
  an adaptive transversal filter unit, operably coupled to bulk delay line unit, whose coefficients are $a_k(n)$, where $k = 0, 1, 2, \ldots, M-1$, where M is a number of taps in the transversal filter unit, and whose output is of a form:

$$p(n) = \sum_{k=0}^{M-1} g(k + n + B_L) a_k(n),$$

where n is a discrete time index and g() is input to the bulk delay line unit.

10. The device of claim 9, wherein $B_L$ is, determined by a talker far echo ranging method.

11. The device of claim 8, further including that the phase-corrected listener echo estimate is of a form: $e_L(n) = p(n) e^{j\psi(n)}$, where n is a discrete time index, p(n) is the first listener echo estimate, and $\psi(n)$ is a listener echo phase correction estimate.

12. The device of claim 11, further including that $\psi(n)$ is determined utilizing one of:
 (A) a listener echo phase error $\theta(n)$ where $$\theta(n) \approx \frac{e_{Lr}(n) q_i(n) - e_{Li}(n) q_r(n)}{|q(n)||e_L(n)|},$$

where $e_{Lr}$ and $e_{Li}$ are the real and imaginary parts, respectively, of $e_L(n)$, and $q_r$ and $q_i$ are the real and imaginary parts, respectively, of the equalized signal q(n); and
further including that a listener echo phase-locked loop of the first correcting unit determines an estimate of the listener echo frequency offset component $f_L(n)$ and a phase correction estimate $\psi(n)$ for correcting the phase of the signal p(n), wherein:

$f_L(n+1) = f_L(n) + b_1 \theta(n)$, and $\psi(n+1) = \psi(n) + b_2 \theta(n) + b_3 f_L(n+1),$ where $b_1$, $b_2$, and $b_3$ are constants that determine a phase-locked loop characteristic, and $f_L(n)$ may be initialized using a talker far echo frequency offset estimate to facilitate an initial convergence; and
 (B) a sign of $\theta(n)$, denoted as s(n):

$s(n) = \text{sign}[e_{Lr}(n) q_i(n) - e_{Li}(n) q_r(n)],$ defining $s(n) = 1$ for $e_{Lr}(n) q_i(n) - e_{Li}(n) q_r(n) > TH,$ $s(n) = -1$ for $e_{Lr}(n) q_i(n) - e_{Li}(n) q_r(n) < TH,$ and s(n) = 0 otherwise, where TH is a small predetermined positive threshold value;
and determining $f_L(n+1) = f_L(n) + d_1 s(n)$, and $\psi(n+1) = \psi(n) + d_2 s(n) + b_3 f_L(n+1)$, where $d_1$ and $d_2$ are selected constants and $f_L(n)$, an estimate of the listener echo frequency offset component, may be initialized using a talker far echo frequency offset estimate to facilitate an initial convergence.

13. The device of claim 11, wherein the first corrected signal, z(n), is of a form:
$z(n) = q(n) - e_L(n)$, where q(n) is the equalized signal.

14. The device of claim 13, further including that the rotated error input, $\eta(n)$ is of a form:
$\eta(n) = \epsilon(n) e^{-j\psi(n)}$, where $\epsilon(n)$ is the error signal from the second correcting means.

15. The device of claim 14, further including that $\phi(n)$ is determined utilizing a received communication signal data phase error $\alpha$ where:

$$\alpha(n) \approx \frac{v_r(n) u_i(n) - u_r(n) v_i(n)}{|v(n)|^2};$$

which is used to estimate a frequency offset of a received communication signal $f_D(n)$ and the received data phase correction estimate $\phi(n)$, such that:

$f_D(n+1) = f_D(n) + c_1 \alpha(n);$ and $$\phi(n+1)=\phi(n)+c_2\alpha(n)+c_3f_D(n+1),$$

where u(n) is the first corrected signal further phase-corrected by $\phi(n)$, $u_r$ and $u_i$ are the real and imaginary parts, respectively, of u(n), $v_r$ and $v_i$ are the real and imaginary parts, respectively, of v(n), and $c_1$, $c_2$, and $c_3$ are constants that determine a desired phase-locked loop characteristic for a phase-locked loop having an input $\alpha(n)$.

16. The device of claim 15, further including that the second corrected signal, u(n), is of a form:
   $u(n)=z(n)e^{j\phi(n)}$, n being the discrete time index and z(n) being the first corrected signal.

17. The device of claim 16, further including that a rotated decision signal d(n) is of a form:
   $d(n)=v(n)e^{-j\phi(n)}$, n being the discrete time index, and v(n) being the reference signal r(n) for selection of a reference directed training mode and being a preliminary decision output for selection of a communication signal receiving mode.

18. The device of claim 8, further including:
   a noise prediction filter (NPF), operably coupled between the equalizing means and the first correcting means to receive and filter the equalized signal, so that a noise spectrum of the equalized signal is whitened; and
   an inverse noise prediction filter ($NPF^{-1}$), operably coupled between the second correcting means and the equalizing means, for filtering the error signal from the second correcting means to provide a filtered error signal for updating equalizer coefficients.

19. A modem having a linear listener echo cancelling device, the modem being utilized for communicating information with a remote device in both directions over a channel, the modem comprising:
   transmission means, operably coupled to receive the information to be communicated, for preparing an analog signal carrying that information for transmission;
   hybrid coupling means, operably coupled to the transmission means and to a receiving means, for transmitting the analog signal and for receiving another analog signal from a remote device;
   talker echo estimating means, operably coupled to the transmission means, for providing a talker echo estimate to the receiving means; and
   the receiving means, operably coupled to the talker echo estimating means and to the hybrid coupling means, for recovering information from the analog signal transmitted by the remote device, said receiving means including one of:
   a linear feedback listener echo canceller, and
   a linear feedforward listener echo canceller, for reducing a listener echo interference,
   encoding means, operably coupled to receive the information to be communicated, for providing an encoded data signal;
   modulation means operably coupled to the encoding means, for providing a modulated signal; and
   transmission filtering means, operably coupled to the modulation means, for providing a modulated filtered transmission data signal at a desired sampling rate; and
   digital-to-analog converting means, operably coupled to the transmission filtering means, for converting the modulated filtered transmission data signal to an analog signal.

20. The modem of claim 19, wherein the talker echo estimating means includes:
   talker far echo delay estimating means for estimating a talker far echo delay; and
   wherein the listener echo correcting means comprises a bulk delay line whose length is determined by the estimated talker far echo delay, for reducing the listener echo interference.

21. The modem of claim 19, wherein the talker echo estimating means includes:
   a far-end echo frequency offset determining means, for estimating a far-end echo frequency offset; and
   wherein the listener echo correcting means comprises a frequency offset phase-correcting means for correcting frequency offset in the listener echo estimate, said phase-correcting means further including a phase-locked loop having an initial value determined by the far-end talker echo frequency offset estimate.

22. The modem of claim 19, wherein the receiving means includes:
   analog-to-digital converting means, operably coupled to the hybrid coupling means, for converting received analog signals to digital signals at a preselected sampling rate;
   first combining means, operably coupled to the talker echo estimating means and to the analog-to-digital converting means, for combining the received digital signal and the talker echo estimate to provide a first talker echo corrected signal;
   rate converting means, where desired, operably coupled to the first combining means, for converting the first talker echo corrected signal, being sampled at a transmitter sampling clock, to a second talker echo corrected signal, being sampled at a desired receiver sampling clock;
   demodulation means, operably coupled to the rate converting means, for providing a demodulated talker echo corrected signal;
   receiving filtering means, operably coupled to the demodulation means, for filtering the demodulated talker echo corrected signal;
   equalizing means, operably coupled to the receiving filtering means, for providing an equalized, demodulated filtered talker echo corrected signal;
   listener echo cancelling means, operably coupled to the equalizing means, for providing a listener echo corrected, equalized, demodulated, filtered talker echo corrected signal; and
   decoding means, operably coupled to the listener echo cancelling means, for decoding the listener echo corrected, equalized, demodulated, filtered, talker echo corrected signal to provide received information.

23. The modem of claim 22, wherein the listener echo cancelling means comprises:
   a first correcting means, operably coupled to the equalizing means and to a second correcting means, and being configured for:
      receiving the equalized signal;
      determining a listener echo estimate; and
      combining the equalized signal with the listener echo estimate to provide a first corrected signal;
   wherein the second correcting means is operably coupled to the first correcting means and to the equalizing means, and is configured for:
      providing a phase correction to the first corrected signal to generate and output a second corrected signal that is an equalized, listener echo-corrected, and phase-corrected communication signal;

providing an error signal to the equalizing means for adjusting an equalization process of the equalizing means, and to the first correcting means for adjusting the listener echo estimate;

providing a rotated reference signal in reference-directed training mode for facilitating an initial training in a listener echo estimation.

24. The modem of claim 23, wherein the first correcting means comprises:

(A) an adding means, operably coupled to the equalizing means and to a listener echo estimating means together with a listener echo phase-correcting means that provide a phase-corrected listener echo estimate, for obtaining a difference between the equalized signal and that listener echo estimate, being the first corrected signal;

(B) listener echo estimating means, operably coupled to one of:
   the primary adding means in a linear feedback configuration, and
   the equalizing means in a linear feedforward configuration; and further being operably coupled to the second correcting means, for utilizing:
   in a data-receiving mode, one of:
      the first corrected signal, and
      the equalized signal; and
   in a reference-directed training mode,
      the rotated reference signal;
   to determine a first listener echo estimate;

(C) listener echo phase error determining means, operably coupled to the listener echo phase correcting means and one of:
   in the data-receiving mode,
      the preliminary decision means, and
   in the reference-directed training mode,
      a reference signal means,
   for determining a listener echo phase error;
wherein the listener echo phase-locked loop means is operably coupled to the listener echo phase error determining means for utilizing the listener echo phase error to provide a listener echo phase correction estimate; and
wherein the listener echo phase correction inverse means is operably coupled to the listener echo phase-locked loop means and to the second correcting means that provides an error signal, for utilizing the listener echo phase correction estimate and the second correcting means error signal for providing a rotated error signal for updating the listener echo estimating means.

25. The modem of claim 23, further including that the second correcting means comprises:

(A) a received data phase correcting means, operably coupled to the first correcting means and to a received data phase-locked loop means, for determining a data phase correction and utilizing that data phase correction to provide a data phase corrected communication signal;

(B) a preliminary decision means, operably coupled to the received data phase correcting means, for providing a preliminary estimate of the communication signal transmitted by a remote modem;

(C) received data phase error determining means, operably coupled to the received data phase correcting means and to one of:
   in the data-receiving mode,
      the preliminary decision means, and
   in the reference-directed training mode,
      the reference signal means,
   for determining a received data phase error α;

(D) received data phase-locked loop means, operably coupled to the received data phase correcting means and to a received data phase correction inverse means, for providing a received data phase correction estimate $\phi(n)$;
the received data phase correction inverse means being operably coupled to the received data phase-locked loop means and to one of:
   the preliminary decision means, and
   the reference signal means,
   to provide a rotated decision signal;

(E) a combiner, operably coupled to the received data phase correction inverse means and to the first correcting means, for subtracting the first corrected signal from the rotated decision signal to provide an error signal $\epsilon(n)$.

26. The modem of claim 24, further including that the listener echo estimating means includes:
a bulk delay line unit, operably coupled to one of:
   in the linear feedback configuration,
      the primary adding means, and
   in a linear feedforward configuration,
      the equalizing means,
   and further being operably coupled to the second correcting means, for providing a delay in accordance with a listener echo bulk delay $B_L$; and
an adaptive transversal filter unit, operably coupled to bulk delay line unit, whose coefficients are $a_k(n)$, where $k=0, 1, 2, \ldots, M-1$, where M is a number of taps in the transversal filter unit, and whose output is of a form:

$$p(n) = \sum_{k=0}^{M-1} g(k + n + B_L)a_k(n),$$

where n is a discrete time index and $g()$ is input to the bulk delay line unit.

27. The modem of claim 26 wherein $B_L$ is, where desired, determined by a talker far echo ranging method.

28. The modem of claim 24, further including that the phase-correction listener echo estimate is of a form: $e_L(n) = p(n)e^{j\psi(n)}$, where n is a discrete time index, $p(n)$ is the first listener echo estimate, and $\psi(n)$ is a listener echo phase correction estimate.

29. The modem of claim 28, further including that $\psi(n)$ is determined utilizing one of:

(A) a listener echo phase error $\theta(n)$ where $$\theta(n) \approx \frac{e_{Lr}(n)q_i(n) - e_{Li}(n)q_r(n)}{|q(n)||e_L(n)|},$$

where $e_{Lr}$ and $e_{Li}$ are the real and imaginary parts, respectively, of $e_L(n)$, and $q_r$ and $q_i$ are the real and imaginary parts, respectively, of the equalized signal $q(n)$; and
further including that a listener echo phase-locked loop of the first correcting unit determines an estimate of the listener echo frequency offset component $f_L(n)$ and a phase correction estimate $\psi(n)$ for correcting a phase of the signal $p(n)$, wherein:

$f_L(n+1)=f_L(n)+b_1\theta(n)$, and $\psi(n+1)=\psi(n)+b_2\theta(n)+b_3f_L(n+1)$, where $b_1$, $b_2$, and $b_3$ are constants that determine a phase lock loop characteristic and $f_L(n)$ is initialized, where desired, utilizing a talker far echo frequency offset estimate to facilitate an initial convergence; and (B) a sign of $\theta(n)$, denoted as s(n):

$s(n)=\text{sign}[e_{Li}(n)q_r(n)-e_{Lr}(n)q_i(n)]$, defining $s(n)=1$ for $e_{Li}(n)q_r(n)-e_{Lr}(n)q_i(n)>TH$, $s(n)=-1$ for $e_{Li}(n)q_r(n)-e_{Lr}(n)q_i(n)<TH$, and s(n)=0 otherwise, where TH is a small predetermined positive threshold value;
and determining $f_L(n+1)=f_L(n)+d_1s(n)$, and $\psi(n+1)=\psi(n)+d_2s(n)+b_3f_L(n+1)$, where $d_1$ and $d_2$ are selected constants.

30. The modem of claim 23, wherein the first corrected signal, z(n), is of a form:
$z(n)=q(n)-e_L(n)$, where q(n) is the equalized signal.

31. The modem of claim 24, further including that the rotated error signal, $\eta(n)$, is of a form:
$\eta(n)=\epsilon(n)e^{-j\psi(n)}$, where $\epsilon(n)$ is the error signal from the second correcting means.

32. The modem of claim 25, further including that the received data phase correction estimate $\phi(n)$ is determined utilizing a received communication signal data phase error $\alpha$ where:

$$\alpha(n) \approx \frac{v_r(n)u_i(n) - u_r(n)v_i(n)}{|v(n)|^2};$$

which is used to estimate a frequency offset of a received communication signal $f_D(n)$ and the received data phase correction estimate $\phi(n)$, such that:

$f_D(n+1)=f_D(n)+c_1\alpha(n)$; and $\phi(n+1)=\phi(n)+c_2\alpha(n)+c_3f_D(n+1)$, where u(n) is the first corrected signal further phase-corrected by $\phi(n)$, $u_r$ and $u_i$ are the real and imaginary parts, respectively, of u(n), $v_r$ and $v_i$ are the real and imaginary parts, respectively, of v(n), and $c_1$, $c_2$, and $c_3$ are constants that determine a desired phase-locked loop characteristic for a phase-locked loop having an input $\alpha(n)$.

33. The modem of claim 23, further including that the second corrected signal, u(n), is of a form:

$u(n)=z(n)e^{j\phi(n)}$.

34. The modem of claim 25, further including that a rotated decision signal d(n) is of a form:
$d(n)=v(n)e^{-j\phi(n)}$, n being the discrete time index, and v(n) being the reference signal r(n) for selection of a reference directed training mode and being a preliminary decision output for selection of a communication signal receiving mode.

35. The modem of claim 23, further including:
a noise prediction filter (NPF), operably coupled between the equalizing means and the first correcting means to receive and filter the equalized signal, so that a noise spectrum of the equalized signal is whitened; and
an inverse noise prediction filter ($NPF^{-1}$), operably coupled between the second correcting means and the equalizing means, for filtering the error signal from the second correcting means to provide a filtered error signal for updating equalizer coefficients.

36. A method for minimizing a listener echo signal interference in a selectively demodulated, equalized communication signal received over a channel having simultaneous transmission and reception, said method comprising the steps of:
receiving said selectively demodulated communication signal, for providing an equalized signal;
determining a listener echo estimate; and
combining said equalized signal with said listener echo estimate to provide a first corrected signal;
providing a phase correction to said first corrected signal to generate and output a second corrected signal that is an equalized, listener echo-corrected and phase-corrected communication signal;
providing an error signal for adjusting said equalization signal and said listener echo estimate;
providing a rotated reference signal in a reference-directed training mode for facilitating an initial training of said listener echo estimate.

37. The method of claim 36, further including the steps of:
(A) obtaining a difference between said equalized signal and that listener echo estimate, being said first corrected signal;
(B) selecting one of:
said first corrected signal,
said equalized signal, and
said rotated reference signal,
as a first selected signal;
(C) utilizing said first selected signal to determine a first listener echo estimate;
(D) providing a listener echo phase correction estimate and combining said first listener echo estimate and said listener echo correction estimate to provide the phase-corrected listener echo estimate;
(E) utilizing said equalized signal and said phase-corrected listener echo estimate to provide a listener echo phase error;
(F) utilizing said listener echo phase error to provide a listener echo phase correction estimate; and
(G) providing an error signal and utilizing said listener echo phase correction estimate and said error signal for providing a rotated error signal for updating said first listener echo estimate.

38. The method of claim 37, further including the steps of:
(A) determining a data phase correction and utilizing that data phase correction to provide a data phase corrected communication signal;
(B) providing a preliminary decision output signal of the communication signal transmitted by the remote modem;
(C) selecting one of:
the preliminary decision output signal, and
a reference signal,
as a second selected signal;
(D) determining a received data phase error $\alpha$;
(E) providing a received data phase correction estimate $\phi(n)$;

(F) providing a rotated decision signal; and
(G) substantially subtracting the first corrected signal from the rotated decision signal to provide an error signal $\epsilon(n)$.

39. The method of claim 38, further including the steps of:
utilizing a bulk delay unit to provide a delay in accordance with a listener echo bulk delay $B_L$; and
utilizing an adaptive transversal filter unit whose coefficients are $a_k(n)$, where $k = 0, 1, 2, \ldots, M-1$, where M is a number of taps in the transversal filter unit, and whose output is of a form $$p(n) = \sum_{k=0}^{M-1} g(k + n + B_L)a_k(n),$$

where n is a discrete time index and g() is input from the first switching unit.

40. The method of claim 39, wherein $B_L$ is determined by a talker far echo ranging method.

41. The method of claim 36, further including that the listener echo estimate is of a form:
$e_L(n) = p(n)e^{j\psi(n)}$, where n is a discrete time index, $p(n)$ is the first listener echo estimate, and $\psi(n)$ is a listener echo phase correction estimate.

42. The method of claim 41, further including that $\psi(n)$ is determined utilizing one of:
(A) a listener echo phase error $\theta(n)$ where $$\theta(n) \approx \frac{e_{Lr}(n)q_i(n) - e_{Li}(n)q_r(n)}{|q(n)||e_L(n)|},$$

where $e_{Lr}$ and $e_{Li}$ are the real and imaginary parts, respectively, of $e_L(n)$, and $q_r$ and $q_i$ are the real and imaginary parts, respectively, of the equalized signal $q(n)$; and
further including that a listener echo phase-locked loop of the first correcting unit determines an estimate of the listener echo frequency offset component $f_L(n)$ and a phase correction estimate $\psi(n)$ for correcting a phase of the signal $p(n)$, wherein:

$f_L(n+1) = f_L(n) + b_1\theta(n)$, and $\psi(n+1) = \psi(n) + b_2\theta(n) + b_3f_L(n+1),$ where $b_1$, $b_2$, and $b_3$ are constants that determine a phase lock loop characteristic and $f_L(n)$ is initialized utilizing a talker far echo frequency offset estimate to facilitate an initial convergence; and
(B) a sign of $\theta(n)$, denoted as $s(n)$:

$s(n) = \text{sign}[e_{Lr}(n)q_i(n) - e_{Li}(n)q_r(n)],$ defining $s(n) = 1$ for $e_{Lr}(n)q_i(n) - e_{Li}(n)q_r(n) > TH,$ $s(n) = -1$ for $e_{Lr}(n)q_i(n) - e_{Li}(n)q_r(n) < TH,$ and $s(n) = 0$ otherwise, where TH is a small predetermined positive threshold value;
and determining $f_L(n+1) = f_L(n) + d_1s(n)$, and
$\psi(n+1) = \psi(n) + d_2s(n) + b_3f_L(n+1)$, where $d_1$ and $d_2$ are selected constants and $f_L(n)$ is initialized using a talker far echo frequency offset estimate to facilitate an initial convergence.

43. The method of claim 36, further including that the first corrected signal, $z(n)$, is of a form:
$z(n) = q(n) - e_L(n)$, where $q(n)$ is the equalized signal.

44. The method of claim 37, further including that the rotated error signal, $\eta(n)$, is of a form:

$\eta(n) = \epsilon(n)e^{-j\phi(n)}$, where $\epsilon(n)$ is the error signal.

45. The method of claim 38, further including that the received data phase correction estimate $\phi(n)$ is determined utilizing a received communication signal data phase error $\alpha$ where:

$$\alpha(n) \approx \frac{v_r(n)u_i(n) - u_r(n)v_i(n)}{|v(n)|^2};$$

which is used to estimate a frequency offset of a received communication signal $f_D(n)$ and the received data phase correction estimate $\phi(n)$, such that:

$f_D(n+1) = f_D(n) + c_1\alpha(n);$ and $\phi(n+1) = \phi(n) + c_2\alpha(n) + c_3f_D(n+1),$ where $u(n)$ is the first corrected signal further phase-corrected by $\phi(n)$, $u_r$ and $u_i$ are the real and imaginary parts, respectively, of $u(n)$, $v_r$ and $v_i$ are the real and imaginary parts, respectively, of $v(n)$, wherein $v(n)$ is the reference signal $r(n)$ for selection of a reference directed training mode and being the preliminary decision output for selection of a communication signal receiving mode, and $c_1$, $c_2$, and $c_3$ are constants that determine a desired phase-locked loop characteristic for a phase-locked loop having an input $\alpha(n)$.

46. The method of claim 36, further including that the second corrected signal, $u(n)$, is of a form:

$u(n) = z(n)e^{j\phi(n)}.$

47. The method of claim 38, further including that the rotated decision signal $d(n)$ is of a form $d(n) = v(n)e^{-j\phi(n)}$, n being the discrete time index.

48. The method of claim 38, further including the steps of:
utilizing a noise prediction filter (NPF) to receive and filter the equalized signal, so that a noise spectrum of the equalized signal is whitened; and
utilizing an inverse noise prediction filter (NPF$^{-1}$) for filtering the error signal to provide a filtered error signal for updating equalizer coefficients.

* * * * *

UNITED STATES PATENT AND TRADEMARK OFFICE
CERTIFICATE OF CORRECTION

PATENT NO. : 5,319,636

DATED : June 7, 1994

INVENTOR(S) : Guozhu Long, Fuyun Ling, M. Vedat Eyuboglu

It is certified that error appears in the above-identified patent and that said Letters Patent is hereby corrected as shown below:

In the Drawings:

FIGs. 2A and 2C should be deleted to appear as per attached sheet.

Signed and Sealed this

Fifteenth Day of November, 1994

Attest:

BRUCE LEHMAN

*Attesting Officer*    *Commissioner of Patents and Trademarks*